US009497114B2

(12) United States Patent
Zaifman et al.

(10) Patent No.: US 9,497,114 B2
(45) Date of Patent: Nov. 15, 2016

(54) LABEL STACK IDENTIFICATION FOR LAWFUL INTERCEPTION OF VIRTUAL PRIVATE NETWORK TRAFFIC

(71) Applicant: AT&T Intellectual Property I, L.P., Atlanta, GA (US)

(72) Inventors: Arthur L. Zaifman, Millburn, NJ (US); John M. Mocenigo, Califon, NJ (US); Donald Barry Mellen, Warren, NJ (US)

(73) Assignee: AT&T Intellectual Propery I, L.P, Atlanta, GA (US)

( * ) Notice: Subject to any disclaimer, the term of this patent is extended or adjusted under 35 U.S.C. 154(b) by 421 days.

(21) Appl. No.: 14/080,177

(22) Filed: Nov. 14, 2013

(65) Prior Publication Data

US 2015/0131653 A1    May 14, 2015

(51) Int. Cl.
H04L 12/743 (2013.01)
H04L 12/723 (2013.01)
H04L 29/06 (2006.01)

(52) U.S. Cl.
CPC .......... H04L 45/507 (2013.01); H04L 63/306 (2013.01)

(58) Field of Classification Search
CPC .......... H04L 12/4633; H04L 12/4645; H04L 45/50; H04L 45/507
See application file for complete search history.

(56) References Cited

U.S. PATENT DOCUMENTS

| 7,092,493 | B2 | 8/2006 | Hou et al. |
| 7,460,484 | B2 | 12/2008 | Roberts et al. |
| 7,730,521 | B1 | 6/2010 | Thesayi et al. |
| 8,116,307 | B1 | 2/2012 | Thesayi et al. |
| 8,116,308 | B2 | 2/2012 | Ellis et al. |
| 8,204,082 | B2 | 6/2012 | Jungck et al. |
| 8,442,030 | B2 | 5/2013 | Dennison |
| 2006/0036892 | A1* | 2/2006 | Sunna ............... H04L 12/4633 714/4.1 |
| 2012/0263183 | A1* | 10/2012 | Weill ................ H04L 12/4633 370/395.53 |
| 2013/0039226 | A1 | 2/2013 | Sridhar |

FOREIGN PATENT DOCUMENTS

| EP | 2 575 389 | 4/2013 |
| WO | 03/105506 | 12/2003 |

OTHER PUBLICATIONS

Raman et al., "Label-based Provider-Provisioned Lawful Intercept for L2 VPNs draft-balaji-l2vpn-lawful-intercept-thru-label-dis-00," L2VPN Working Group, Internet-Draft, Experimental RFC, Jan. 2013, 10 pages.

* cited by examiner

*Primary Examiner* — Feben M Haile
(74) *Attorney, Agent, or Firm* — Hanley, Flight & Zimmerman, LLC

(57) ABSTRACT

Methods, apparatus, systems and articles of manufacture (e.g., physical storage media, such as storage devices and/or storage disks) to implement label stack identification for lawful interception of virtual private network traffic are disclosed. Example methods disclosed herein can include detecting a trigger that is to cause synchronization of label stack data associated with first virtual private network traffic to be intercepted, the label stack data used to route the first virtual private network traffic in a network. Such example methods can also include, in response to detecting the trigger, initiating execution of a first command on a first router in the network to determine a first label used to route the first virtual private network traffic in the network. Such example methods can further include determining a current label stack for the first virtual private network traffic based on the first label.

17 Claims, 7 Drawing Sheets

(12) United States Patent
US 9,497,114 B2

LABEL STACK IDENTIFICATION FOR LAWFUL INTERCEPTION OF VIRTUAL PRIVATE NETWORK TRAFFIC

FIELD OF THE DISCLOSURE

This disclosure relates generally to lawful interception of network traffic and, more particularly, to label stack identification for lawful interception of virtual private network traffic.

BACKGROUND

Government laws and regulations, such as the Communications Assistance for Law Enforcement Act (CALEA) in the United States, can require network providers to be able to intercept specific network traffic in response to lawful requests from law enforcement agencies and/or other government entities. Prior techniques for lawful interception of digital network traffic include active techniques and passive techniques. Prior active techniques involve tagging network packets associated with entities whose network traffic is to be intercepted. Prior passive techniques involve snooping or, in other words, monitoring and examining the control plane signaling exchanges between network elements (e.g., routers) to remain in-sync with the routing state of the network traffic to be intercepted.

BRIEF DESCRIPTION OF THE DRAWINGS

Wherever possible, the same reference numbers will be used throughout the drawing(s) and accompanying written description to refer to the same or like parts, elements, etc.

DETAILED DESCRIPTION

Figure 1:
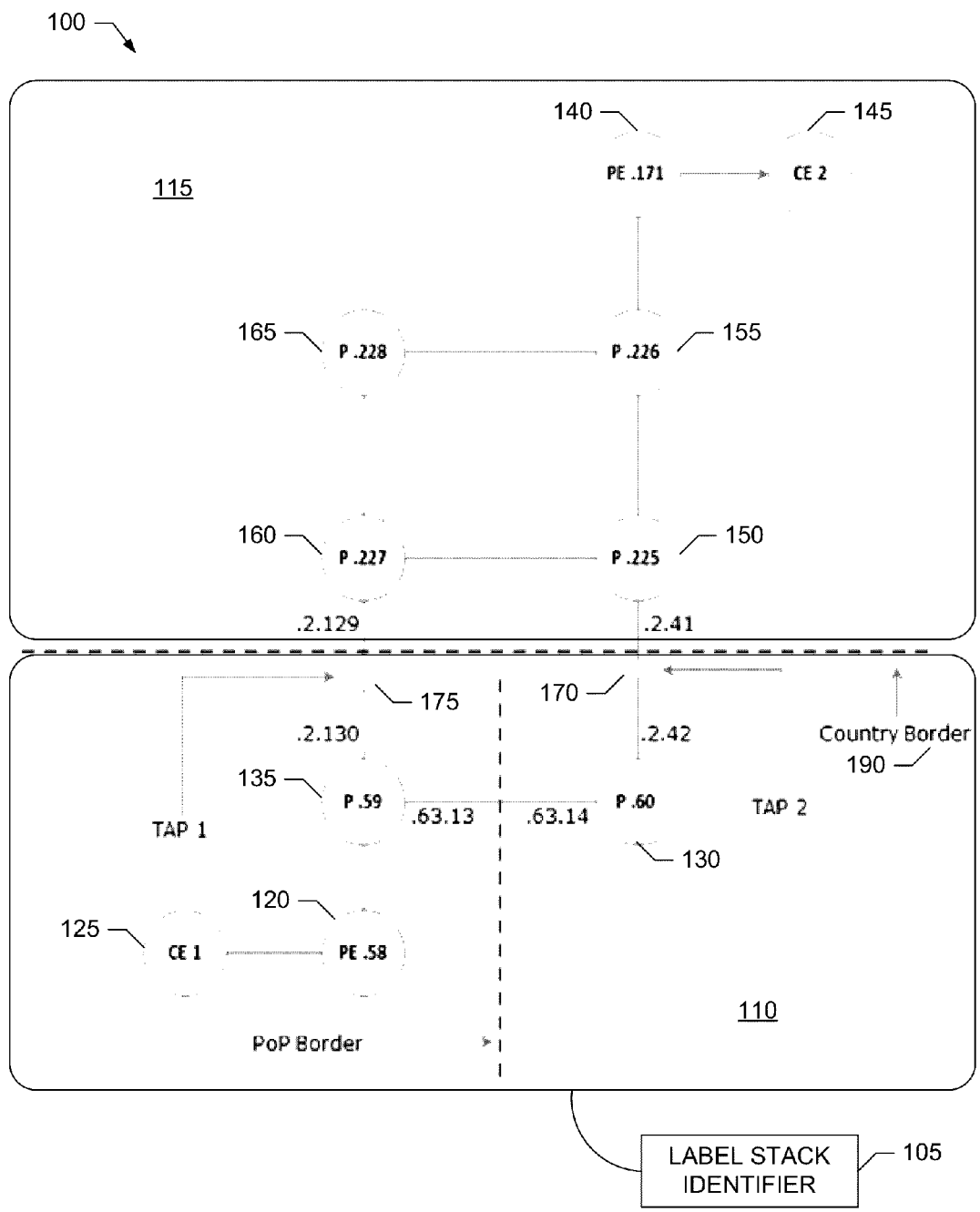
FIG. 1 is a block diagram of an example communication network including an example label stack identifier to provide label stack identification for lawful interception of virtual private network traffic, as disclosed herein.

Label stack identification for lawful interception of virtual private network traffic is disclosed herein. Example methods disclosed herein to perform label stack identification for lawful interception of virtual private network traffic can include detecting a trigger that is to cause synchronization of label stack data associated with first virtual private network traffic to be intercepted. As disclosed in further detail below, the label stack data is used to route the first virtual private network traffic in a network. Such example methods can also include, in response to detecting the trigger, initiating execution of a first command on a first router in the network to determine a first label used to route the first virtual private network traffic in the network. Such example methods can further include determining a current label stack for the first virtual private network traffic based on the first label.

Furthermore, some such example methods can include, in response, to detecting the trigger, initiating execution of a second command on at least one of the first router and a second router in the network to determine a second label used to route the first virtual private network traffic in the network. Such examples methods can also include determining the current label stack for the first virtual private network traffic based on the first label and the second label. Such examples methods can further include providing the current label stack to a network tap that is to intercept the first virtual private network traffic.

In some examples, such methods can further include snooping routing update messages exchanged between routers in the network to obtain a destination router of the first virtual private network traffic in the network. Some such example methods can also include (1) selecting a result of executing the first command when next hop data included in the result of executing the first command includes the destination router, (2) reading the first label from the result of the first command, (3) selecting a result of executing the second command when a destination included in the result of executing the second command includes the destination router, and (4) reading the second label from the result of the second command. Other such example methods can also include (1) selecting a result of executing the first command when next hop data included in the result of executing the first command includes the destination router, (2) reading the first label from the result of the first command, (3) selecting a result of executing the second command when a destination included in the result of executing the second command includes the first router, and (4) reading the second label from the result of the second command.

Additionally or alternatively, some such example methods can further include snooping update messages exchanged between routers in the network to obtain a third label used to route the first virtual private network traffic in the network. Such examples methods can also include determining the current label stack for the first virtual private network traffic based on the first label, the second label and the third label. In some examples, such methods can additionally include, in response to detecting the trigger, initiating execution of a third command on a same target router on which the second command was executed. Such example methods can also include, when source and destination information included in a result of executing the third command includes the same target router and a router located opposite a tap via which the first virtual private network traffic is to be intercepted, reading a fourth label from the result of executing the third command. Such example methods can further include determining the current label stack for the first virtual private network traffic based on the first label, the second label, the third label and the fourth label. For example, the first label can be a label distribution protocol label, the second label can be a traffic engineering label, the third label can be a virtual private network label and the fourth label can be a fast reroute label.

Additionally or alternatively, some disclosed example methods also include comparing prior label stack data associated with the first virtual private network traffic with the current label stack determined for the first virtual private network traffic to determine auditing data associated with lawful interception of the first virtual private network traffic.

Additionally or alternatively, in some disclosed example methods, the trigger is based on a change event occurring in the network. In such example methods, detecting the trigger can include detecting occurrence of the change event. For example, detecting occurrence of the change event can include receiving a trap corresponding to a tunnel associated with the change event, and determining whether the tunnel corresponding to the trap is also a tunnel carrying the first virtual private network traffic.

These and other example methods, apparatus, systems and articles of manufacture (e.g., physical storage media, such as storage devices and/or storage disks) to perform label stack identification for lawful interception of virtual private network traffic are disclosed in greater detail below.

As noted above, there is a need for network providers to be able to intercept specific network traffic in response to lawful requests from law enforcement agencies and/or other government entities. Some prior active techniques for lawful interception of digital network traffic involve tagging network packets associated with entities whose network traffic is to be intercepted. However, such techniques require changing the network packets being routed in the network (e.g., to insert or otherwise add the appropriate tags), which may require modifying some or all of the network elements (e.g., such as routers) responsible for routing network traffic in the network. Other prior passive techniques for lawful interception of digital network traffic involve snooping or, in other words, monitoring and examining the control plane signaling exchanged between network elements (e.g., routers) to remain in-sync with the routing state of the network traffic to be intercepted. Although such prior passive techniques may not require changing the network packets being routed in the network, such prior techniques are dependent on accurately detecting and decoding the control planes signaling messages exchanged in the network. Accordingly, such prior passive techniques are also susceptible to inaccuracies, such as having stale, out-of-date routing state information for specific network traffic to be intercepted, if, for example, a critical control plane message is missed during the snooping process.

Example methods, apparatus, systems and articles of manufacture disclosed herein to implement label stack identification for lawful interception of virtual private network (VPN) traffic can solve the problem of how to correctly and efficiently identify customer traffic, such as VPN traffic, in provider edge and core networks utilizing label-based routing without modifying the network packets carrying the customer traffic. This problem arises primarily in the context of lawful interception imposed as a compliance requirement on network providers. Unlike the prior lawful interception techniques, label stack identification for lawful interception herein involves directly communicating with the network elements (e.g., routers) periodically and/or when events dictate to obtain up-to-date routing state information, such as up-to-date label stack information, for the network traffic to be intercepted. As described in further detail below, label stack identification for lawful interception takes advantage of commands supported by application programming interfaces (APIs) implemented by the network elements (e.g., routers) to query the network elements for information from which the current label stack for network traffic associated with a specified VPN customer can be determined.

For example, label stack identification for lawful interception as disclosed herein can utilize automated procedures to synchronize the label stack information for a specified VPN customer to a current label stack state by issuing appropriate API commands to one or more network elements (1) at start-up, (2) periodically and/or (3) through the reception of one or more triggers indicative of a need to resynchronize. Such triggers can compensate for the lack of visibility between periodic refreshes, which may be especially useful in fast reroute (FRR) networks in which traffic can be quickly rerouted from a primary tunnel to a back tunnel upon the primary tunnel becoming unavailable. For example, triggers such as a start-up trigger, a periodic timer trigger and receipt of one or more event triggers, such as one or more simple network management protocol (SNMP) traps, can cause label stack identification to be performed by issuing appropriate API commands, as described in further detail below, to one or more network elements in a provider's edge and/or core networks to enable synchronization of the current label stack state for network traffic associated with a specific customer.

Benefits of label stack identification for lawful interception of VPN traffic as disclosed herein can include improved accuracy relative to other prior lawful interception techniques. For example, accuracy can arise through proactive reception of network state information provided by a network element, which provides the network element's current view of the network. Additionally or alternatively, the label stack information received from the network elements (e.g., routers) through automated refreshes, if stored, can be used as an audit trail for the data being transferred to law enforcement agencies in a lawful intercept context, or simply to provide an information warehouse in other contexts.

Turning to the figures, a block diagram of an example communication network 100 including an example label stack identifier 105 to provide label stack identification for lawful interception of VPN traffic as disclosed herein is illustrated in FIG. 1. The communication network 100 of the illustrated example includes an example in-country network 110 and an example out-of-country network 115. In the illustrated example of FIG. 1, the label stack identifier 105 is configured, as described in further detail below, to communicate with one or more network elements implementing the in-country network 110 to obtain label stack information for traffic to be intercepted as it enters or leaves the in-country network 110 along a geographical border between countries, such as an example border 190. However, the label stack identifier 105 is not limited to obtaining label stack information for traffic that is to be intercepted as it enters or leaves a network along a geographical border between countries. For example, although the in-country network 110 and the out-of-country network 115 of FIG. 1 are depicted as residing in different countries, in other examples. the in-country network 110 and the out-of-country network 115 could be any two networks 110 and 115 (e.g., residing within the same country, spread among multiple countries, etc.) separated by any type of border 190, such as a physical and/or logical border between networks of different network providers, a physical and/or logical border between a network provider's network and a customer's network, a physical and/or logical border between different types of sub-networks in a network provider's network, etc.

The network elements implementing the example in-country network 110 of FIG. 1 includes edge network routers, such as an example provider edge (PE) router 120 and an example customer edge (CE) router 125, and core network routers, such as example provider (P) routers 130 and 135. Similarly, the example out-of-country network 115 of FIG. 1 includes edge network routers, such as an example PE router 140 and an example CE router 145, and core network routers, such as example P routers 150, 155, 160 and 165. In the illustrated example of FIG. 1, the CE routers 125 and 145 are associated with a particular customer and provide network access, such as VPN access, between two customer sites associated with the particular customer. The PE router 120 implements, at least in part, a provider edge network in the in-country network 110 and provides the CE router 125 with access to the in-country network 110. The P routers 130 and 135 of the in-country network 110 implement, at least in part, a core network to route traffic within the in-country network 110 and between the in-country network 110 and the out-of-country network 115. Similarly, the PE router 140 implements, at least in part, a provider edge network in the out-of-country network 115 and provides the CE router 145 with access to the out-of-country network 115. The P routers 150, 155, 160 and 165 of the out-of-country network 115 implement, at least in part, a core network to route traffic within the out-of-country network 115 and between the out-of-country network 115 and the in-country network 110. The CE routers 125 and/or 145, the PE routers 120 and/or 140, and/or the P routers 130, 135, 150, 155, 160 and/or 165 can be implemented by any number and/or type(s) of routers, bridges, network nodes, servers, etc., or combinations thereof. Additionally or alternatively, the CE routers 125 and/or 145, the PE routers 120 and/or 140, and/or the P routers 130, 135, 150, 155, 160 and/or 165 can be implemented by one or more processing systems, such as the processing platform 800 of FIG. 8, which is described in greater detail below.

In the illustrated example of FIG. 1, the communication network 100 employs one or more routing update protocols, such as the border gateway protocol (BGP) to exchange routing information among network elements. The communication network 100 of the illustrated example also employs labels to route network packets among network elements. For example, the in-country network 110 and the out-of-country network 115 can implement multiprotocol label switching (MPLS) networks that employ label switched paths (LSPs) to create communication paths between the different network elements in their respective networks, and between network elements across the in-country network 110 and the out-of-country network 115. In such examples, the PE routers 120 and 140, and the P routers 130, 135, 150, 155, 160 and 165 implement label switch router (LSR) functionality to perform routing based on labels that are added to network packets being routed in the network 100. In some examples, downstream LSRs that are to be recipients of a routed packet specify and distribute labels to be used to define the LSPs to be used to carry traffic associated with a particular destination. For example, the communication network 100 may employ the label distribution protocol (LDP), and/or any other protocol or protocols, to distribute LDP labels specified by downstream LSRs and defining the LSPs to be used to carry traffic associated with a particular destination. Additionally, in some examples, the communication network 100 may employ a traffic engineering protocol, such as the resource reservation protocol-traffic engineering (RSVP-TE) protocol and/or any other protocol or protocols, to assign traffic engineering (TE) labels to network traffic associated with specified customers and/or traffic flows to permit the network provider to manage network characteristics, such as quality of service, available bandwidth, jitter, etc. Furthermore, in some examples, the communication network 100 may employ a rerouting protocol, such as the MPLS fast reroute (FRR) protocol to add FRR labels, if needed, to network traffic to permit fast rerouting of the traffic in response to network failures and/or other events that may occur in the network 100. Also, in some examples, the PE routers 120 and 140 may assign VPN labels for respective VPNs associated with the customer sites communicatively coupled to the network 100 via the CE routers 125 and 145.

Because the communication network 100 relies on labels to route network packets, the set of labels associated with a network packet, also referred to as the label stack of the network packet, defines the routing state for the network packet. Such routing state information can be used to associate network packets being routed from one network element to another network element with a particular customer, thereby permitting network packets for specified customer(s) to be intercepted during routing. For example, the communication network 100 includes example network taps 170 and 175 that are capable of intercepting network traffic being routed from and/or to the P routers 130 and 135 of the in-country network 110. Such interception of network packets can include, for example, copying network packets associated with a specified customer and sending the copied network packets to one or more data servers, diverting network packets associated with a specified customer to one or more data servers, blocking network packets associated with a specified customer, etc. The network taps 170 and/or 175 may be separate from, or implemented by, the respective P routers 130 and/or 135. Accordingly, the network taps 170 and/or 175 can be implemented by any number and/or type(s) of routers, bridges, network nodes, servers, monitors, etc., or combinations thereof. Additionally or alternatively, the network taps 170 and/or 175 can be implemented by one or more processing systems, such as the processing platform 800 of FIG. 8, which is described in greater detail below.

As mentioned above and described in further detail below, the label stack identifier 105 performs label stack identification for lawful interception of VPN traffic. In the illustrated example of FIG. 1, the label stack identifier 105 issues one or more API commands to one or more of the network elements, such as the PE router 120, and/or one or more of the P routers 130 and/or 135, to obtain information from which a current label stack can be determined for a selected customer's VPN traffic to be intercepted. The label stack identifier 105 of the illustrated example then uses the information obtained from the network elements, including the current label stack determined for the VPN traffic, to configure one or more of the network taps 170 and/or 175 to intercept the selected customer's VPN traffic.

Figure 2:
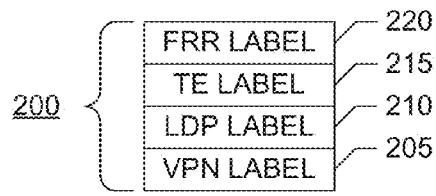
FIG. 2 illustrates an example label stack capable of being identified by the example label stack identifier of FIG. 1.

An example label stack 200 that may be identified by the example label stack identifier 105 of FIG. 1 is illustrated in FIG. 2. The label stack 200 of the illustrated example includes an example VPN label 205, an example LDP label 210, and example TE label 215 and an example FRR label 220. Of course, a label stack identified by the example label stack identifier 105 for traffic to be intercepted may include fewer or more labels than those shown in the example label stack 200 of FIG. 2, and/or different labels than those shown in the example label stack 200 of FIG. 2.

Returning to FIG. 1, as also mentioned above and described in further detail below, the label stack identifier 105 may determine when to issue one or more API commands to the one or more of the network elements based on detecting one or more triggers. For example, the label stack identifier 105 may issue API commands to the PE router 120 and/or one or more of the P routers 130 and/or 135 to obtain information from which a current label stack can be determined for a selected customer's VPN traffic in response to detecting one or more of (1) a start-up trigger, (2) a periodic timer trigger and/or (3) receipt of one or more event triggers. An example implementation of the label stack identifier 105 is illustrated in FIG. 3 and described in further detail below.

Although the example communication network 100 of FIG. 1 is depicted as including two CE routers 125 and 145, two PE routers 120 and 140, and six P routers 130, 135, 150, 155, 160 and/or 165, the communication network 100 can include any number of CE routers, PE routers and P routers. Also, although operation of the label stack identifier 105 is described in the context of intercepting VPN traffic in an MPLS-TE/FRR network, such as the communication network 100, the example label stack identification methods, apparatus, articles of manufacture and systems disclosed herein are not limited thereto. On the contrary, the label stack identification techniques implemented by the label stack identifier 105 can be used in any type of communication network that employs labels for routing data in the network. Furthermore, although operation of the label stack identifier 105 is described in the context of intercepting network traffic leaving or entering the in-country network 110 of the communication network 100, the example label stack identification methods, apparatus, articles of manufacture and systems disclosed herein are not limited thereto. On the contrary, the label stack identification techniques implemented by the label stack identifier 105 can be used to intercept network traffic anywhere within a network, such as the communication network 100. Moreover, although the illustrated example of FIG. 1 depicts the label stack identifier 105 as being in communication with the in-country network 110, the label stack identifier 105 can be configured to communicate with the out-of-country network 115, both the in-country network 110 and the out-of-country network 115, and/or any other network domain of the communication network 100.

Figure 3:
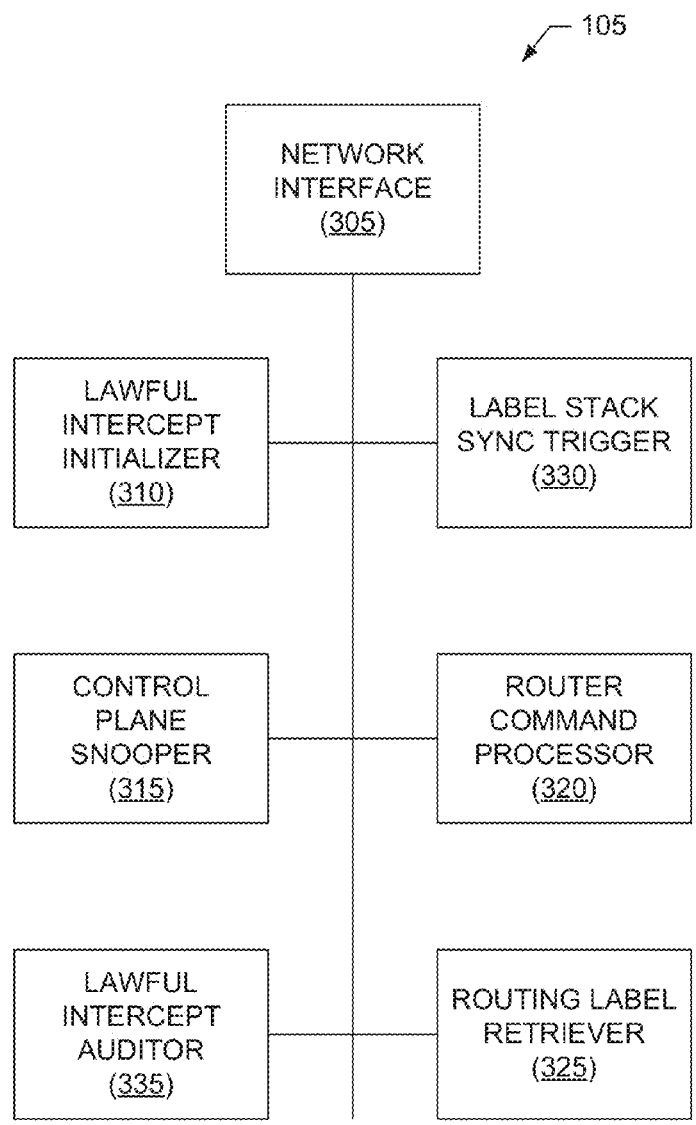
FIG. 3 is a block diagram illustrating an example implementation of the label stack identifier of FIG. 1.

A block diagram of an example implementation of the label stack identifier 105 of FIG. 1 is illustrated in FIG. 3. The example label stack identifier 105 of FIG. 3 includes an example network interface 305 to communicatively couple with one or more networks, such as the in-country network 110, to permit the label stack identifier 105 to communicate with network elements, such as the routers 120, 130 and/or 135, which are responsible for routing network traffic. The network interface can be implemented by any type(s) and/or number of network interfaces, such as the example interface circuit 820 of the example processor platform 800 of FIG. 8, which is described in further detail below.

The example label stack identifier 105 of FIG. 3 also includes an example lawful intercept initializer 310 to initialize operation of the label stack identifier 105. For example, lawful intercept initializer 310 may receive BGP route targets, which identify the customers for which VPN traffic is to be intercepted. Additionally or alternatively, the lawful intercept initializer 310 may receive network configuration information, such as (1) information specifying the names and/or addresses of the network elements (such as the routers 120, 130 and/or 135) included in a network (e.g., the in-network 110) in which traffic is to be intercepted, (2) information specifying which network elements are associated with network taps (e.g., such as the network taps 170 and 175), (3) the names and/or addresses of the network taps, (4) country border information (e.g. to specify network locations at which traffic is permitted to be intercepted), etc. The lawful intercept initializer 310 may receive the initialization data (e.g., the route targets, the network element names and/or addresses, border information, etc.) via the network interface 305, a graphical user interface (GUI), any other data input, etc., or combination thereof.

The example label stack identifier 105 of FIG. 3 further includes an example control plane snooper 315 to snoop control plane message exchanged with network elements (such as the routers 120, 130 and/or 135) included in a network (e.g., the in-network 110) in which traffic is to be intercepted. For example, the control plane snooper 315 may snoop BGP update messages and/or any other messages containing routing information that are sent to and/or sent by the routers 120, 130 and/or 135 included in the network 110. In some examples, the control plane snooper 315 extracts information from the snooped control plane messages (e.g., the snooped BGP update messages) to identify the network topology of the network (e.g., such as the in-country network 110) in which traffic is to be intercepted. For example, the control plane snooper 315 can extract information from snooped BGP update messages to identify the PE router (e.g., such as the PE router 120), or other provider edge network element coupled to a CE router (e.g., such as the CE router 125) or other customer edge network element, that is a source or destination of traffic associated with a particular route target that has been targeted for interception. Additionally or alternatively, the control plane snooper 315 can extract information from snooped BGP update messages to identify the P router(s) (e.g., such as the P router 135) and/or other provider core network elements that are directly coupled to the PE router or other provider edge network element carrying traffic that is targeted for interception. Additionally or alternatively, the control plane snooper 315 can extract information from snooped BGP update messages to determine a next-hop and/or a destination network element for traffic that is targeted for interception. In some examples, for VPN traffic associated with a route target specified for interception, the control plane snooper 315 can determine a VPN label assigned by provide edge network element (e.g., such as the PE router 120) to be used for routing the VPN traffic between the provide edge network element and the associated customer edge network element (e.g., such as the CE router 125).

As described above, the label stack identifier 105 issues one or more API commands to one or more network elements (e.g., such as the routers 120, 130 and/or 135) to obtain information from which a current label stack can be determined for a selected customer's VPN traffic to be intercepted. Accordingly, the example label stack identifier 105 of FIG. 3 includes an example router command processor 320 to issue API commands to and receive associated responses from network elements, and an example routing label retriever 325 to retrieve label stack information from the responses received by the router command processor 320 to the API commands issued to the network elements. For example, the router command processor 320 can issue one or more of a first API command to a first network element (e.g., a first one of the routers 120, 130 and/or 135) of a network (e.g., the in-country network 110) in which VPN traffic is to be intercepted, a second API command to the first network element or a second network element (e.g., a second one of the routers 120, 130 and/or 135) of the network, and/or a third API command to the first network element, the second network element or a third network element (e.g., a third one of the routers 120, 130 and/or 135) of the network, etc. In such examples, the routing label retriever 325 can then determine a current label stack for VPN traffic to be intercepted by determining a first label from first information obtained in response to the first API command, determining a second label from second information obtained in response the second API command, determining a third label from third information obtained in response the third API command, etc. For example, the first label may be an LDP label, the second label may be a TE label, the third label may be an FRR label, etc. Examples of the API commands that may be issued by the router command processor 320 include, but are not limited to, show mpls forwarding commands (e.g., specifying a prefix and length) that return MPLS LDP forwarding information, show mpls traffic-eng tunnels commands that return MPLS traffic engineering tunnel information, show mpls traffic-eng tunnels backup commands that return MPLS traffic engineering backup tunnel information, etc., which are supported by Cisco® routers and compatible network elements. Of course, other API commands that return network state information similar to that returned by the foregoing example API commands and/or by the examples API commands described in further detail below, but that are supported by other types of routers, network elements, etc., may additionally or alternatively be issued and processed by the label stack identifier 105.

In some examples, the router command processor 320 can determine the network element(s) to which API commands is(are) to be issued based on information obtained from the control plane snooper 315 and/or information obtained from prior issued API command(s). Additionally or alternatively, the routing label retriever 325 can determine the network element(s) for which API command response(s) is(are) to be processed based on information obtained from the control plane snooper 315 and/or information obtained from prior issued API command(s). For example, and as described in further detail below, the control plane snooper 315 can snoop routing update messages exchanged between network elements (e.g., routers) to determine a destination router of the VPN traffic to be intercepted. In such examples, the routing label retriever 325 can (1) select a result of executing a first API command (e.g., a show mpls forwarding command) on a first network element when next hop data included in the result of executing the first API command includes the destination router determined by the control plane snooper 315, and (2) read a first label from the result of the first API command. In some such examples (e.g., such as when egress traffic is being intercepted, as described in further detail below), the routing label retriever 325 can also (1) select a result of executing a second API command (e.g., a show mpls traffic-eng tunnels command) on the first network element or a second network element when a destination included in the result of executing the second API command includes the destination router determined by the control plane snooper 315, and (2) read a second label from the result of the second API command. In other such examples (e.g., such as when ingress traffic is being intercepted, as described in further detail below), the routing label retriever 325 can (1) select a result of executing the second command when a destination included in the result of executing the second API command includes the first router on which the first API command was executed, and (2) read the second label from the result of the second API command. For example, the first label may be an LDP label and the second label may be a TE label used to route the VPN traffic to be intercepted.

Additionally or alternatively, and as described in further detail below, the control plane snooper 315 can snoop routing update messages exchanged between network elements (e.g., routers) to determine a third label (e.g., such as a VPN label) used to route the first virtual private network traffic in the network, and the routing label retriever 325 can include this third label in the current label stack determined for the VPN traffic to be intercepted. In some such examples, the router command processor 320 can initiate execution of a third API command (e.g., a show mpls traffic-eng tunnels backup command) on the same network element on which the second API command discussed above was executed and from which a current TE label for the VPN traffic was determined. In such examples, when source and destination information included in a result of executing the third command includes the same network element on which the second API command was executed and a network element located opposite a network tap via which the VPN traffic is to be intercepted, the routing label retriever 325 can read a fourth label (e.g., such as an FRR label) from the result of executing the third API command. In such examples, the routing label retriever 325 can determine the current label stack for the VPN traffic to be intercepted to include the first label (e.g., the LDP label), the second label (e.g., the TE label), the third label (e.g., the VPN label) and the fourth label (e.g., the FRR label).

In the illustrated example of FIG. 3, the label stack identifier 105 also includes an example label stack synchronization trigger 330 to trigger the label stack identifier 105 and, more specifically, one or more of the control plane snooper 315, the router command processor 320, the routing label retriever 325, etc., to determine a current label stack for VPN traffic to be intercepted. For example, the label stack synchronization trigger 330 can assert a trigger to cause label stack determination to occur (1) at start-up of the label stack identifier 105, (2) periodically (e.g., based on a timer) and/or (3) through the reception of one or more network change events indicative of a need to resynchronize. For example, label stack synchronization trigger 330 can generate its trigger based on a start-up trigger asserted at startup, a periodic timer trigger asserted each time a periodic timer expires, an event trigger asserted upon receipt/detection of one or more network change events, such as one or more simple network management protocol (SNMP) traps, etc., or any combination thereof. Example of SNMP traps that may cause assertion of the event trigger include, but are not limited to, ifUp/ifDown traps indicating whether an identified network interface of a network element has been turned on or off, linkUp/linkDown traps indicating whether an identified network link has changed state and is now up or down, mplsTunnelUp/mplsTunnelDown traps indicating whether an identified MPLS tunnel has changed state and is now up or to down, mplsTunnelRerouted traps indicating whether an identified MPLS tunnel is being rerouted, etc. In some examples, an event trigger may be asserted in response to detecting network change event(s) associate with any tunnel in the network, whereas in other examples, the event trigger may be asserted in response to receiving a trap corresponding to a tunnel associated with the change event, and determining that the tunnel corresponding to the trap is also a tunnel carrying the VPN traffic to be intercepted. As noted above, the event triggers can compensate for the lack of visibility between periodic refreshes of the label stack.

The example label stack identifier 105 of FIG. 3 further includes an example lawful intercept auditor 335 to store and provide information to support auditing of the VPN traffic that is intercepted based on operation of the label stack identifier 105. For example, the lawful intercept auditor 335 can compare prior label stack data associated with VPN network traffic to be intercepted with a current label stack determined for the VPN traffic to determine auditing data associated with the lawful interception of the VPN traffic. For example, the auditing data may indicate that VPN traffic intercepted during an interval of time is reliable and accurately associated with a particular VPN customer if the prior label stack and the current label stack indicate that the label stack for the VPN traffic was unchanged during the time interval. Conversely, the auditing data may indicate there is a possibility that the VPN traffic intercepted during an interval of time is unreliable and may not be associated with the particular VPN customer if the prior label stack and the current label stack indicate that the label stack for the VPN traffic changed during the time interval.

Example operations of the label stack identifier 105 of FIG. 3 to identify a label stack for VPN traffic to be intercepted in the in-country network 110 of the example communication network 100 of FIG. 1 are now described. In the following example operations, the lawful intercept initializer 310 of the label stack identifier 105 obtains, via the network interface 305, a GUI, etc., user input specifying a list of P routers, including the P routers 130 and 135, in the in-country network 110. The list of P routers includes: (1) the name of each P router, which is for use in issuing the API show commands to the P routers, (2) the Internet protocol (IP) loopback address for each P router, which is for use in identifying P routers in the responses received from issuing the API show commands, (3) indicators as to whether a P router is associated with one of the network taps 170 and 175, which is used to identify which tap is to be used to intercept the targeted VPN traffic, etc. In the example operations, the lawful intercept initializer 310 also obtains, via the network interface 305, a GUI, etc., initialization information specifying a list of in-country and/or out-of-country PE routers, such as the PE router 120 and/or 140, which are connected to potentially targeted customers whose VPN traffic is to be intercepted. The PE router initialization information obtained by the lawful intercept initializer 310 can include, but is not limited to, (1) the IP loopback address for each PE router, which is for use in identifying PE routers, (2) a list of BGP route targets associated with each respective PE router, (3) a country or other network association information for each respective PE routers, which can be used to determine whether the VPN traffic to be intercepted is ingress traffic entering into the in-country network 110, or egress traffic exiting out of the in-country network 110, etc. In these example operations, the lawful intercept initializer 310 also obtains, via the network interface 305, a GUI, etc., initialization information specifying a list of BGP route targets associated with the customers whose VPN traffic is to be intercepted. The route target initialization information is used, for example, to filter snooped BGP updates messages to obtain information relevant to the VPN traffic to be intercepted, as described in further detail below. In some examples, some or all of the foregoing initialization information may be obtained from data input manually via a GUI, and/or from a data feed provided by a computing platform containing a centralized repository of network element configuration information, which is monitored by the lawful intercept initializer 310 via the network interface 305.

In the following example operations, it is assumed, but not required, that only network traffic entering or leaving the in-country network 110 will be targeted for interception. For the case of egress traffic, this means that the source PE and P routers will be located in the in-country network 110 and that the destination PE and P routers will be located in the out-of-country network 115. For the case of ingress traffic, this means that the source PE and P routers will be located in the out-of-country network 115 and that the destination PE & P routers will be located in the in-country network 110.

In the following example operations, the label stack identifier 105 of FIG. 3 employs the following general procedure to identify a label stack for VPN traffic to be intercepted.

(1) The lawful intercept initializer 310 of the label stack identifier 105 obtains the initialization information described above.

(2) The router command processor 320 of the label stack identifier 105 issues show mpls forwarding API commands to be run on one or more, or all, of the P routers included in the P router initialization information. As described in further detail below, P routers directly connected to PE routers will have a string instead of a number in the Out label field of the response to the show mpls forwarding API command. This information is used to identify in-country P and PE routers that are directly connected. Also, the responses to these commands (e.g., which can correspond to the example first API command described above and in further detail below) can be used by the routing label retriever 325 of the label stack identifier 105 to identify the LDP label(s) to be included in the label stack of the VPN traffic to be intercepted.

(3) The router command processor 320 issues one or more of the following API commands on one or more, or all, of the P routers included in the P router initialization information (e.g., such as the P routers associated with the network taps identified in the network tap initialization information): show mpls traffic-eng tunnels role head detail, show mpls traffic-eng tunnels role middle detail, show mpls traffic-eng tunnels role tail detail, show mpls traffic-eng tunnels backup. The responses to these commands (e.g., which can correspond to the example second and third API commands described above and in further detail below) can be used by the routing label retriever 325 to identify the TE label(s) and/or FRR label(s) to be included in the label stack of the VPN traffic to be intercepted.

(4) The control plane snooper 315 of the label stack identifier 105 starts a BGP client which filters BGP update messages snooped via the network interface 305 and identifies those that match the following criteria. BGP update messages containing an MP-UNREACH-NLRI Path Attribute, which includes network layer reachability information (NLRI) specifying routes that are unreachable via an advertising router, are used to remove VPN labels from being considered for inclusion in the label stack being identified for VPN traffic to be intercepted. Conversely, BGP update messages containing an EXTENDED-COMMUNITIES Path Attribute which contains a BGP route target which matches a route target including in the route target initialization information (e.g., specifying route targets for customers whose VPN traffic is to be intercepted) are processed as follows. The MP-REACH-NLRI Next-Hop attribute included in the BGP update message specifies the address of the destination PE router for the VPN traffic to be intercepted. This destination PE router address is used to process the show mpls forwarding API commands to identify the LDP label(s) for inclusion in the label stack for the VPN traffic to be intercepted, and to determine the TE tunnels carrying the VPN traffic (which is used for processing the show mpls traffic-eng tunnels role head detail, show mpls traffic-eng tunnels role middle detail, show mpls traffic-eng tunnels role tail detail and/or show mpls traffic-eng tunnels backup commands as discussed in further detail below).

(5) The label stack identifier 105 provides the identified label stack for the VPN traffic to be intercepted to the appropriate network tap 170, 175 to enable the network tap to intercept the network traffic.

According to the foregoing general procedure, the label stack identifier 105 in the following examples constructs label stacks based on specified route target provided in the initialization information. The label stack identifier 105 uses the Next-Hop attribute in a snooped BGP update message to determine the traffic flow direction. Because the BGP Next-Hop is the destination of an LDP tunnel, there are two possible scenarios to consider: (1) the Next Hop corresponds to a PE router in the out-of-country network 115 and, thus, the VPN traffic to be intercepted is egress traffic out of the in-country network 110, and (2) the Next Hop corresponds to a PE router in the in-country network 110 and, thus, the VPN traffic to be intercepted is ingress traffic into the in-country network 110. Further example operations performed by the label stack identifier 105 to handle these two scenarios are now described.

An example procedure for identifying a label stack for egress VPN traffic, which is leaving the in-country network 110, to be intercepted is as follows. The label stack identifier 105 begins with a route target of interest. The label stack identifier 105 then identifies a VPN label to include in the label stack as follows. First, the control plane snooper 315 of the label stack identifier 105 selects the snooped BGP update message(s) with an EXTENDED-COMMUNITIES Path Attribute containing a matching route target. The Next-Hop attribute in the MP-REACH-NLRI path attribute of such a selected BGP update message represents the destination PE router for the VPN traffic associated with the specified route target, and the label(s) in this NLRI attribute can be used as the VPN label(s) to be included in the label stack for the VPN traffic to be intercepted. Also, the destination PE router included in the MP-REACH-NLRI path attribute should agree with the initialization information, and is used to evaluate responses to the show mpls forwarding commands.

Next, the label stack identifier 105 proceeds as follows to determine an LDP label to include in the label stack for the VPN traffic to be intercepted. The routing label retriever 325 of the label stack identifier 105 searches the list of PE router and country initialization information described above to determine if the destination PE router identified by the processing of the BGP update messages by the control plane snooper 315 is in-country or out-of-country. For egress traffic, the PE router will be out-of-country. Next, the routing label retriever 325 finds a response to a show mpls forwarding API command issued by the router command processor 320 of the label stack identifier 105 in which the output of the show mpls forwarding API command includes an entry having a Prefix field matching the destination PE router address (e.g., which was obtained from the BGP Next-Hop attribute of the selected BGP update message described above). Because the Prefix in this entry corresponds to a destination of egress traffic, the Outgoing Label included in this same entry of the response to the show mpls forwarding API command should be a number, and is the LDP label to be included by the routing label retriever 325 in the label stack being identified for the VPN traffic to be intercepted. Furthermore, the Next Hop address included in this same entry of the response to the show mpls forwarding API command corresponds to the LDP next hop destination P router of an MPLS tunnel that is to carry the VPN traffic to be intercepted.

If the initialization information specifies a secondary, or alternative, PE router for the destination PE router address included in the BGP Next-Hop attribute of the selected BGP update message described above, the routing label retriever 325 can also look for show mpls forwarding API command response(s) with Prefixes matching the secondary PE router, and can include the LDP label associated with this secondary PE router in the label stack being identified for the VPN traffic to be intercepted.

Next, the label stack identifier 105 proceeds as follows to determine a TE label to include in the label stack for the VPN traffic to be intercepted. The routing label retriever 325 finds responses to show mpls traffic-eng tunnels role head detail and show mpls traffic-eng tunnels role middle detail API commands issued by the router command processor 320 in which (1) the Destination field included in the responses to these commands matches the LDP Next Hop destination P router determined during identification of the LDP label, as described above, and (2) a downstream P router for traffic to be routed to the Destination is not in the in-country network 110 or, in other words, is out-of-country (e.g., as determined based on the initialization information described above). The OutLabel field included in such a matching response corresponds to the TE label to be included by the routing label retriever 325 in the label stack for the VPN traffic to be intercepted. Additionally, the local router on which the matching show mpls traffic-eng tunnels role head detail or show mpls traffic-eng tunnels role middle detail command was executed corresponds to the specific P router that is routing the VPN traffic to be intercepted. Accordingly, the label stack identifier 105 can select the network tap associated with this P router and provision that network tap with the identified label stack for the egress VPN traffic to be intercepted.

It is noted that, if the P router routing the VPN traffic to be intercepted is directly connect to a PE router, a response from the show mpls traffic-eng tunnels role head details command issued to and executed on that P router will include the matching Destination field described above. However, if the P router is not directly connected to a PE router, the response from a show mpls traffic-eng tunnels role middle details command issued to and executed on that P router will include the matching Destination field described above. Because egress traffic flow is being intercepted, responses to any show mpls traffic-eng tunnels role tail details commands can be ignored. Also, because egress traffic flow is being intercepted, if the response to any of the show mpls traffic-eng tunnels role head details, show mpls traffic-eng tunnels role middle details and show mpls traffic-eng tunnels role tail details commands includes a downstream P router that is in-country, the response can be ignored (because the traffic egressing the in-country network 110 is to be intercepted).

In some examples, the label stack identifier 105 proceeds as follows to determine an FRR label to include in the label stack for the egress VPN traffic to be intercepted. The routing label retriever 325 finds responses to the show mpls traffic-eng tunnels backup API commands issued by the router command processor 320 in which the source (Src) matches the local P router on which the API command used to identify the TE label was executed, and the destination (Dest) matches the downstream P router included in the API command response used to identify the TE label, as described above. These responses represent any FRR backup tunnels used to reroute the VPN traffic to be intercepted. Using the Instance number included in the response to such a selected show mpls traffic-eng tunnels backup command, the routing label retriever 325 finds any TE tunnels which match the Src, Dest and Instance and whose downstream router is out-of-country. These TE tunnels are the back-up tunnels, if any, and the OutLabel included in the response corresponds to the FRR label to be included in the label stack being identified for the VPN traffic to be intercepted. Also, the local router on which the matching show mpls traffic-eng tunnels backup command was executed corresponds to the specific P router that provides backup routing of the VPN traffic to be intercepted. Accordingly, the label stack identifier 105 can additionally or alternatively select the network tap associated with this P router and provision that network tap with the identified label stack for the VPN traffic to be intercepted.

An example procedure for identifying a label stack for ingress VPN traffic into the in-country network 1100 to be intercepted is as follows. The label stack identifier 105 begins with a route target of interest. The label stack identifier 105 then identifies a VPN label to include in the label stack as follows. First, the control plane snooper 315 of the label stack identifier 105 selects the snooped BGP update messages with an EXTENDED-COMMUNITIES Path Attribute containing a matching route target. The Next-Hop attribute in the MP-REACH-NLRI path attribute of such a selected BGP update message represents the destination PE router for the VPN traffic associated with the specified route target, and the label(s) in this NLRI attribute can be used as the VPN label(s) to be included in the label stack for the VPN traffic to be intercepted. Also, the destination PE router included in the MP-REACH-NLRI path attribute should agree with the initialization information, and is used to evaluate responses to the show mpls forwarding" commands.

Next, the label stack identifier 105 proceeds as follows to determine an LDP label to include in the label stack for the VPN traffic to be intercepted. The routing label retriever 325 of the label stack identifier 105 searches the list of PE router and country initialization information described above to determine if the destination PE router identified by the processing of the BGP update messages by the control plane snooper 315 is in-country or out-of-country. For ingress traffic, the PE router will be in-country. Next, the routing label retriever 325 finds a response to a show mpls forwarding API command issued by the router command processor 320 of the label stack identifier 105 in which the output of the show mpls forwarding API command includes an entry having a Prefix field matching the destination PE router address (e.g., included in BGP Next-Hop attribute of the selected BGP update message described above). Because the Prefix in this entry corresponds to a destination of ingress traffic, the Outgoing Label included in this same entry of the response to the show mpls forwarding API command should be a string and not a number. In such an example, the Local Label included in this same entry is the LDP label to be included by the routing label retriever 325 in the label stack being identified for the VPN traffic to be intercepted. Furthermore, the P router on which this matching show mpls forwarding API command was executed corresponds to the LDP next hop destination P router of an MPLS tunnel that is to carry the VPN traffic to be intercepted.

If the initialization information specifies a secondary, or alternative, PE router for the destination PE router address included in BGP Next-Hop attribute of the selected BGP update message described above, the routing label retriever 325 can also look for show mpls forwarding API command having outputs with Prefixes matching the secondary PE router, and can include the LDP label associated with this secondary PE router in the label stack being identified for the VPN traffic to be intercepted.

Next, the label stack identifier 105 proceeds as follows to determine a TE label to include in the label stack for the VPN traffic to be intercepted. The routing label retriever 325 finds responses to the show mpls traffic-eng tunnels role middle detail and show mpls traffic-eng tunnels role tail detail API commands issued by the router command processor 320 in which (1) the Destination field included in the responses to these commands matches the PE router on which the matching show mpls forwarding was executed for identification of the LDP label, as described above, and (2) the upstream P router from which traffic is received for routing to the Destination is not in the in-country network 110 or, in other words, is out-of-country (e.g., as determined based on the initialization information described above). The InLabel field included in such a matching response corresponds to the TE label to be included by the routing label retriever 325 in the label stack for the VPN traffic to be intercepted. Additionally, the local router on which the matching show mpls traffic-eng tunnels role middle detail or show mpls traffic-eng tunnels role tail detail command was executed corresponds to the specific P router that is routing the VPN traffic to be intercepted. Accordingly, the label stack identifier 105 can select the network tap associated with this P router and provision that network tap with the identified label stack for the ingress VPN traffic to be intercepted.

It is noted that, if the P router routing the VPN traffic to be intercepted is directly connect to a PE router, a response from the show mpls traffic-eng tunnels role tail details command issued to and executed on that P router will include the matching Destination field described above. However, if the P router is not directly connected to a PE router, the response from a show mpls traffic-eng tunnels role middle details command issued to and executed on that P router will include the matching Destination field described above. Because ingress traffic flow is being intercepted, responses to any show mpls traffic-eng tunnels role head details commands can be ignored. Also, because ingress traffic flow is being intercepted, if the response to any of the show mpls traffic-eng tunnels role head details, show mpls traffic-eng tunnels role middle details and show mpls traffic-eng tunnels role tail details commands includes an upstream P router that is in-country, the response can be ignored (because the traffic ingressing from the out-of-country network 115 is to be intercepted).

In some examples, the label stack identifier 105 proceeds as follows to determine an FRR label to include in the label stack for the ingress VPN traffic to be intercepted. The routing label retriever 325 finds responses to the show mpls traffic-eng tunnels backup API commands issued by the router command processor 320 in which the destination (Dest) matches the local P router on which the API command used to identify the TE label was executed, and the source (Src) matches the upstream P router included in the API command used to identify the TE label, as described above. These responses represent any FRR backup tunnels used to reroute the VPN traffic to be intercepted. Using the Instance number included in the response to such a selected show mpls traffic-eng tunnels backup command, the routing label retriever 325 finds any TE tunnels which match the Src, Dest and Instance and whose upstream router is out-of-country. These TE tunnels are the back-up tunnels, if any, and the InLabel included in the response corresponds to the FRR label to be included in the label stack being identified for the VPN traffic to be intercepted. Also, the local router on which the matching show mpls traffic-eng tunnels backup command was executed corresponds to the specific P router that provides backup routing of the VPN traffic to be intercepted. Accordingly, the label stack identifier 105 can additionally or alternatively select the network tap associated with this P router and provision that network tap with the identified label stack for the VPN traffic to be intercepted.

The foregoing procedures for identifying the label stacks for egress and/or ingress VPN traffic to be intercepted can be executed in response to trigger(s) provided by the label stack synchronization trigger 330 of the label stack identifier 105.

The following tables illustrate examples of the label stack identifier 105 performing the foregoing procedures to identify label stacks for egress and ingress VPN traffic to be intercepted in the example communication network 100 of FIG. 1. For example, label stacks are constructed by the label stack identifier 105 for each specified route target and PE router associated with a specified route target. In the following examples, the P and PE routers in the communication network 100 are assumed to have the following loopback IP addresses:

PE router 120 has loopback address 10.64.0.58 (labeled PE.58 in FIG. 1);

P router 130 has loopback address 10.64.0.59 (labeled P.59 in FIG. 1);

P router 135 has loopback address 10.64.0.60 (labeled P.60 in FIG. 1);

PE router 140 has loopback address 10.64.0.171 (labeled PE.171 in FIG. 1);

P router 150 has loopback address 10.64.0.225 (labeled P.225 in FIG. 1);

P router 155 has loopback address 10.64.0.226 (labeled P.226 in FIG. 1);

P router 160 has loopback address 10.64.0.227 (labeled P.227 in FIG. 1);

P router 165 has loopback address 10.64.0.228 (labeled P.228 in FIG. 1).

In the following example of the label stack identifier 105 identifying a label stack for egress VPN traffic to be intercepted in the communication network 100, the VPN traffic follows an egress path from 10.64.0.58 to 10.64.0.171 as follows:

10.64.0.58→10.64.0.59→10.64.0.60→10.64.0.225→
10.64.0.226→10.64.0.171.

Accordingly, the network tap for intercepting the egress VPN traffic along its primary path is the network tap 170, which is located between 10.64.0.60 and 10.64.0.225. In this example, the label stack for the egress VPN traffic at that point in the network 100 is:

{TE label=18604, LDP label=18288, VPN label}.

There is also a fast reroute path from 10.64.0.60 to 10.64.0.255 of:

10.64.0.60→10.64.0.59→10.64.0.227→10.64.0.225.

Accordingly, the network tap for intercepting the egress VPN traffic along its backup path is the network tap 175, which is located between 10.64.0.59 and 10.64.0.227. In this example, the label stack for the egress VPN traffic at that point in the network 100:

{FRR Label=18098, TE label=18604, LDP label=18288, VPN label}.

The example depicted in Tables 1-6 of identifying the label stack for the egress VPN traffic targeted for interception in the communication network 100 begins with the route target for the VPN traffic being specified (e.g., in a warrant) and being provided to the lawful intercept initializer 310 of the label stack identifier 105. The control plane snooper 315 of the label stack identifier 105 searches for received BGP update messages with a matching route target in the Extended Communities path attribute. From the matches, a list of PE routers (e.g., identified in the BGP Next-Hop field) and VPN labels (Reachable NLRI attributes field) are obtained. For this example, two PE routers are identified, namely, 10.64.0.171 (corresponding to PE router 140) is out-of-county and 10.64.0.58 (corresponding to PE router 120) is in-country. Furthermore, from examining the output of the show mpls forwarding commands issued by the router command processor 320 of the label stack identifier 105, the label stack identifier 105 has determined that 10.64.0.58 (i.e., PE router 120) is adjacent to 10.64.0.59 (i.e., P router 135), but not 10.64.0.60 (i.e., P router 130).

To determine the LDP label for the label stack, the routing label retriever 325 of the label stack identifier 105 searches for responses to show mpls forwarding API commands issued by the router command processor 320 that include the destination address 10.64.0.171 (corresponding to PE router 140) identified previously by processing the Next Hop fields of BGP update messages containing the specified route target. Tables 1 and 2 illustrate example outputs of executing the show mpls forwarding API commands on 10.64.0.59 (i.e., P router 135) and 10.64.0.60 (i.e., P router 130), respectively. The responses to the show mpls forwarding API commands executed on these routers both indicate that the destination address 10.64.0.171 (corresponding to PE router 140) has an LDP label of 18288, as expected. Furthermore, these responses both identify the LDP next hop destination P router to be 10.64.0.226 (corresponding to P router 155).

TABLE 1

Example of Obtaining Label Stack for Egress Traffic:

1) Example Output of a show mpls forwarding Command Executed on P Router 135 (i.e., 10.64.0.59)

RP/0/6/CPU0:BEBRNJ1001CR1#show mpls forwarding

| Local Label | Outgoing Label | Prefix or ID | Outgoing Interface | Next Hop | Bytes Switched |
|---|---|---|---|---|---|
| -- | | | | | |
| ... | | | | | |
| 16538 | Pop | 10.64.10.225/32 | tt225 | 10.64.0.225 | 0 |
| 16539 | Pop | 10.64.10.226/32 | tt226 | 10.64.0.226 | 0 |
| 16540 | 18288 | 10.64.0.171/32 | tt226 | 10.64.0.226 | 2121266 |
| 16541 | 16849 | 10.80.10.68/32 | tt225 | 10.64.0.225 | 0 |
| 16542 | 16850 | 10.80.10.108/32 | tt225 | 10.64.0.225 | 0 |

TABLE 2

Example of Obtaining Label Stack for Egress Traffic:

2) Example Output of a show mpls forwarding Command Executed on P Router 130 (i.e., 10.64.0.60)

RP/0/7/CPU0:BEBRNJ1002CR1# show mpls forwarding

| Local Label | Outgoing Label | Prefix or ID | Outgoing Interface | Next Hop | Bytes Switched |
|---|---|---|---|---|---|
| 16539 | Pop | 10.64.10.225/32 | tt225 | 10.64.0.225 | 0 |
| 16540 | Pop | 10.64.10.226/32 | tt226 | 10.64.0.226 | 0 |
| 16541 | 18288 | 10.64.0.171/32 | tt226 | 10.64.0.226 | 0 |
| 16542 | 16849 | 10.80.10.68/32 | tt225 | 10.64.0.225 | 0 |
| 16543 | 16850 | 10.80.10.108/32 | tt225 | 10.64.0.225 | 0 |

As described above, identifying the TE label(s) involves examining the results from the show mpls traffic-eng tunnels role head detail and show mpls traffic-eng tunnels role middle detail API commands where the destination matches the LDP next hop destination P router identified when determining the LDP label, which is 10.64.0.226 (corresponding to P router 155) in this example. Also, because the destination is out-of-country, examination of the responses to the show mpls traffic-eng tunnels role tail detail commands can be skipped.

In this example, Table 3 illustrates an example output of executing the show mpls traffic-eng tunnels role head detail command on the P router 10.64.0.59 (i.e., P router 135). The output includes a destination that matches the destination P router 10.64.0.226 (i.e., P router 155), but the downstream P router (i.e., 10.64.0.60, corresponding to P router 130) is located in-country and, as such, can be ignored. It is assumed in this example that the output of executing the show mpls traffic-eng tunnels role middle detail command on the P router 10.64.0.59 (i.e., P router 135) does not match the destination P router 10.64.0.226 (i.e., P router 155) and, thus, can also be ignored.

In this example, Table 4 illustrates an example output of executing the show mpls traffic-eng tunnels role middle detail command on the P router 10.64.0.60 (i.e., P router 130). The output includes a destination that matches the destination P router 10.64.0.226 (i.e., P router 155), and the downstream P router (i.e., 10.64.0.225, corresponding to P router 150) is located out-of-country. Accordingly, the OutLabel included in the output, which is 18604, is the TE label included in the label stack for the egress VPN traffic to be intercepted.

TABLE 3

Example of Obtaining Label Stack for Egress Traffic:
3) Example Output of a show mpls traffic-eng tunnels role head detail Command Executed on P router 135 (i.e., 10.64.0.59)

```
RP/0/6/CPU0:BEBRNJ1001CR1#show mpls traffic-eng tunnels role head detail
Name: tunnel-te226   Destination: 10.64.0.226
    Status:
        Admin:  up Oper:  up  Path:  valid  Signalling: connected
...
    Current LSP Info:
        Instance: 6813, Signaling Area: OSPF 50 area 0.0.0.0
        Uptime: 3d17h (since Thu Apr 25 18:00:15 GMT 2013)
        Outgoing Interface: Bundle-POS1211, Outgoing Label: 17342
        Router-IDs: local           10.64.0.59
                    downstream      10.64.0.60  ← In-country, ignore
        Path Info:
            Outgoing:
            Explicit Route:
                Strict, 10.64.63.14
                Strict, 10.64.2.41
                Strict, 10.64.2.10
```

TABLE 4

Example of Obtaining Label Stack for Egress Traffic:
4) Example Output of a show mpls traffic-eng tunnels role middle detail Command Executed on P Router 130 (i.e., 10.64.0.60)

```
RP/0/7/CPU0:BEBRNJ1002CR1#show mpls traffic-eng tunnels role middle detail
LSP Tunnel 10.64.0.59 226 [6813] is signalled, connection is up
    Tunnel Name: BEBRNJ1001CR1__t226 Tunnel Role: Mid
    InLabel: Bundle-POS1211, 17342
    OutLabel: Bundle-POS2001, 18604 ← TE Label
    Signalling Info:
        Src 10.64.0.59 Dst 10.64.0.226, Tun ID 226, Tun Inst 6813, Ext ID 10.64.0.59
```

TABLE 4-continued

Example of Obtaining Label Stack for Egress Traffic:
4) Example Output of a show mpls traffic-eng tunnels role middle
detail Command Executed on P Router 130 (i.e., 10.64.0.60)

```
Router-IDs: upstream       10.64.0.59
            local          10.64.0.60
            downstream     10.64.0.225 ← Out-of-country, FRR Dest
Bandwidth: 1 kbps (CT0) Priority: 3 3 DSTE-class: 3
Path Info:
    Incoming Address: 10.64.63.14
    Incoming:
    Explicit Route:
        Strict, 10.64.63.14
        Strict, 10.64.2.41
        Strict, 10.64.2.10
        Strict, 10.64.0.226
    Outgoing:
    Explicit Route:
        Strict, 10.64.2.41
        Strict, 10.64.2.10
        Strict, 10.64.0.226
```

Thus, in this example, the routing label retriever 325 of the label stack identifier 105 determines the label stack for the egress VPN traffic targeted for interception by combining the TE label and the LDP label with the VPN label obtained from the BGP update messages. In this example, the resulting label stack is {TE label=18604, LDP label=18288, VPN label}, as expected. Also, because the TE label was an OutLabel obtained from a command run on P router 10.64.0.60 (i.e., P router 130), this label stack is associated with egress traffic that can be intercepted by the network tap 170 associated with the P router 130.

Continuing this example, the FRR label represents an alternate path between the local router 10.64.0.60 (i.e., P router 130) and the downstream router 10.64.0.225 (i.e., P router 150). In this example, the FRR label and associated network tap for intercepting the egress VPN traffic along the backup path can be determined as follows. The routing label retriever 325 of the label stack identifier 105 examines the results of the show mpls traffic-eng tunnels backup command invoked by the router command processor 320 of the label stack identifier 105 on the local router 10.64.0.60 (i.e., P router 130) and searches for a tunnel with Src of 10.64.0.60 (i.e., P router 130) and Dst of 10.64.0.225 (i.e., P router 150), as described above. Table 5 illustrates an example output of executing the show mpls traffic-eng tunnels backup command on the P router 10.64.0.60 (i.e., P router 130). If there are no matches, there is no backup tunnel. However, in this example, there is a match. From the match, the instance is 3343. Next, the routing label retriever 325 searches the tunnels included in the different types of show mpls traffic-eng tunnel role commands executed on the different routers for one that matches the criteria (Src: 10.64.0.60, Dst: 10.64.0.225, Instance: 3343). In this example, there are two matches. In the first matching response, the response identifies a tunnel head at 10.64.0.60 (i.e., P router 130 and downstream router of 10.64.0.59 (i.e., P router 135). Because the downstream router (10.64.0.59, corresponding to P router 135) is in-country, this response can be ignored. Table 6 illustrates the other match, which corresponding to the output of executing a show mpls traffic-eng tunnel role middle command on 10.64.0.59 (i.e., P router 135). The downstream router in that response is 10.64.0.227 (corresponding to P router 160), which is out-of country. Accordingly, this response represents where the backup tunnel leaves the country. Accordingly, the OutLabel included in the output, which is 18908, is the FRR label included in the label stack for the egress VPN traffic to be intercepted, and the routing label retriever 325 of the label stack identifier 105 determines FRR label stack for the egress VPN traffic targeted for interception to be {FRR label=18098, TE label=18604, LDP label=18288, VPN label}, as expected. Also, because the FRR label was an OutLabel obtained from a command run on P router 10.64.0.59 (i.e., P router 135), this FRR label stack is associated with egress traffic that can be intercepted by the network tap 175 associated with the P router 135.

TABLE 5

Example of Obtaining Label Stack for Egress Traffic:
5) Example Output of a show mpls traffic-eng tunnels backup
Command Executed on P Router 130 (i.e., 10.64.0.60)

```
RP/0/7/CPU0:BEBRNJ1002CR1#show mpls traffic-eng tunnels backup
tunnel-te60000
    Admin: up, Oper: up
    Src: 10.64.0.60, Dest: 10.64.0.225, Instance: 3343 ← For finding FRR Tunnels
    Fast Reroute Backup Provided:
        Protected LSPs: 8 (0 active)
        Protected S2L Sharing Families: 0
        Protected S2Ls: 0
        Backup BW: any-class unlimited, Inuse: 9 kbps
        Protected i/fs: BP2001
```

TABLE 6

Example of Obtaining Label Stack for Egress Traffic:
6) Example Output of a show mpls traffic-eng role middle detail
Command Executed on P router 135 (i.e., 10.64.0.59)

RP/0/6/CPU0:BEBRNJ1001CR1#show mpls traffic-eng tunnels role middle detail
...
LSP Tunnel 10.64.0.60 60000 [3343] is signalled, connection is up
    Tunnel Name: BEBRNJ1002CR1_t60000 Tunnel Role: Mid
    InLabel: Bundle-POS1211, 17972
    OutLabel: Bundle-POS2001, 18098 ← FRR label
    Signalling Info:
        Src 10.64.0.60 Dst 10.64.0.225, Tun ID 60000, Tun Inst 3343, Ext ID 10.64.0.60
        Router-IDs: upstream       10.64.0.60
                   local           10.64.0.59
                   downstream    10.64.0.227 ← Out-of-country
    Bandwidth: 1 kbps (CT0) Priority: 1 1 DSTE-class: 0
    Path Info:
        Incoming Address: 10.64.63.13
        Incoming:
        Explicit Route:
            Strict, 10.64.63.13
            Strict, 10.64.2.129
...

The example depicted in Tables 7-9 of identifying the label stack for the ingress VPN traffic targeted for interception in the communication network 100 begins as described above for the case of egress VPN traffic. Using the procedure described above for the case of egress VPN traffic, the control plane snooper 315 of the label stack identifier 105 identifies the two PE routers, namely 10.64.0.171 (corresponding to PE router 140) is out-of-county and 10.64.0.58 (corresponding to PE router 120) is in-country, corresponding to the ingress VPN traffic to be intercepted. Here, because ingress traffic is being intercepted, the destination PE router is the in-country router 10.64.0.58 (i.e., PE router 120). Furthermore, as in the case of egress VPN traffic, from examining the output of the show mpls forwarding commands issued by the router command processor 320 of the label stack identifier 105, the label stack identifier 105 determines that 10.64.0.58 (i.e., PE router 120) is adjacent to 10.64.0.59 (i.e., P router 135), but not 10.64.0.60 (i.e., P router 130).

To determine the LDP label for the label stack, the routing label retriever 325 of the label stack identifier 105 uses the response for a show mpls forwarding command issued by the router command processor 320 of the label stack identifier 105 for execution on the in-country P router(s) adjacent to PE router 10.64.0.58 (i.e., PE router 120). In this example, the adjacent P router is router 10.64.0.59 (i.e., P router 135), and an example output of executing the show mpls forwarding command on this router is illustrated in Table 7. This output includes an entry with a Prefix of 10.64.0.58 (corresponding to PE router 120) and the Local Label corresponds to the LDP label, which is 16000 in this example.

TABLE 7

Example of Obtaining Label Stack for Ingress Traffic:

1) Example Output of a show mpls forwarding Command Executed on P Router 135 (i.e., 10.64.0.59)

RP/0/6/CPU0:BEBRNJ1001CR1#show mpls forwarding

| Local Label | Outgoing Label | Prefix or ID | Outgoing Interface | Next Hop | Bytes Switched |
|---|---|---|---|---|---|
| -- | | | | | |
| 16500 | Unlabelled | 10.64.0.58/32 | Gi0/10/0/0 | 10.64.64.1 | 13762440 |
| 16501 | Pop | 10.64.10.58/32 | Gi0/10/0/0 | 10.64.64.1 | 2523040 |
| 16502 | Pop | 10.80.255.50/32 | PO0/13/0/3 | 10.80.64.1 | 0 |
| 16503 | 16500 | 10.64.0.61/32 | tt60 | 10.64.0.60 | 0 |

As described above, identifying the TE label(s) involves examining the results from the show mpls traffic-eng tunnels role middle detail and show mpls traffic-eng tunnels role tail detail API commands where the destination matches the router address of the P router (i.e., the router 10.64.0.59, corresponding to P router 135) on which the show mpls forwarding command used to determine the LDP label was executed. Also, because the destination is in-country, examination of the responses to the show mpls traffic-eng tunnels role head detail commands can be skipped.

In this example, it is assumed that the output of executing the show mpls traffic-eng tunnels role middle detail command on the P router 10.64.0.59 (i.e., P router 135) does not include a destination matching the destination P router 10.64.0.226 (i.e., P router 155) and, thus, can also be ignored. Table 8 illustrates an example output of executing the show mpls traffic-eng tunnels role tail detail command on the P router 10.64.0.59 (i.e., P router 135). The output includes a destination that matches the destination P router 10.64.0.59 (i.e., P router 135), but the upstream P router (i.e., 10.64.0.60, corresponding to P router 130) is located in-country and, as such, can be ignored.

In this example, Table 4 illustrates an example output of executing the show mpls traffic-eng tunnels role middle detail command on the P router 10.64.0.60 (i.e., P router 130). The output includes a destination that matches the P router 10.64.0.59 (i.e., P router 135), and an upstream P router (i.e., 10.64.0.225, corresponding to P router 150) is located out-of-country. Accordingly, the InLabel included in this example output, which is 16011, is the TE label included in the label stack for the ingress VPN traffic to be intercepted.

TABLE 8

Example of Obtaining Label Stack for Ingress Traffic:
2) Example Output of a show mpls traffic-eng tunnels role tail
detail Command Executed on P router 135 (i.e., 10.64.0.59)

RP/0/6/CPU0:BEBRNJ1001CR1#show mpls traffic-eng tunnels role tail detail
...
LSP Tunnel 10.64.0.226 59 [6705] is signalled, connection is up
    Tunnel Name: GBLONJ2002CRS_t59 Tunnel Role: Tail
    InLabel: Bundle-POS1211, implicit-null
    Signalling Info:
        Src 10.64.0.226 Dst 10.64.0.59, Tun ID 59, Tun Inst 6705, Ext ID 10.64.0.226
        Router-IDs: upstream        10.64.0.60 ← In-country, Ignore
                local           10.64.0.59
    Bandwidth: 1 kbps (CT0) Priority: 3 3 DSTE-class: 3
    Path Info:
        Incoming Address: 10.64.63.13
        Incoming:
        Explicit Route:
            Strict, 10.64.63.13

TABLE 9

Example of Obtaining Label Stack for Ingress Traffic:
3) Example Output of a show mpls traffic-eng tunnels role middle
detail Command Executed on P Router 130 (i.e., 10.64.0.60)

RP/0/7/CPU0:BEBRNJ1002CR1#show mpls traffic-eng tunnels role middle detail
LSP Tunnel 10.64.0.225 59 [263] is signalled, connection is up
    Tunnel Name: GBLONJ2001CRS_t59 Tunnel Role: Mid
    InLabel: Bundle-POS2001, 16512 ← TE Label
    OutLabel: Bundle-POS1211, implicit-null
    Signalling Info:
        Src 10.64.0.225 Dst 10.64.0.59, Tun ID 59, Tun Inst 263, Ext ID 10.64.0.225
        Router-IDs: upstream        10.64.0.225 ← Out-of-country
                local              10.64.0.60
                downstream     10.64.0.59
    Bandwidth: 1 kbps (CT0) Priority: 3 3 DSTE-class: 3
    Path Info:
        Incoming Address: 10.64.2.42
        Incoming:
        Explicit Route:
            Strict, 10.64.2.42
            Strict, 10.64.63.13
            Strict, 10.64.0.59
        Outgoing:
        Explicit Route:
            Strict, 10.64.63.13
            Strict, 10.64.0.59

Thus, in this example, the routing label retriever 325 of the label stack identifier 105 determines the label stack for the ingress VPN traffic targeted for interception by combining the TE labels and LDP labels with VPN labels obtained from the BGP update messages. In this example, the resulting label stack is {TE label=16011, LDP label=16000, VPN label}. Also, because the TE label was an InLabel obtained from a command run on P router 10.64.0.60 (i.e., P router 130), this label stack is associated with ingress traffic that can be intercepted by the network tap 170 associated with the P router 130.

Continuing this example, the FRR label to be included in the label stack for ingress VPN traffic targeted for interception can be obtained as before, except the Src is now the upstream router and the Dst is the P router identified when determining the TE label. Then, as described above, the routing label retriever 325 first finds which backup tunnel(s) have the specified Src and Dst. Next, the routing label retriever 325 uses the Src, Dst and Instance to find any backup tunnels where the upstream router is out-of-country. Then, the routing label retriever 325 uses the In Label and associates it with the router on which the command was run. However, in this example, there is no FRR backup tunnel for the ingress VPN traffic to be intercepted. Accordingly, the routing label retriever 325 does not determine an FRR label for inclusion in the label stack.

While an example manner of implementing the communication network 100 of is illustrated in FIGS. 1-3, one or more of the elements, processes and/or devices illustrated in FIGS. 1-3 may be combined, divided, re-arranged, omitted, eliminated and/or implemented in any other way. Further, the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330, the example lawful intercept auditor 335 and/or, more generally, the example communication network 100 of FIGS. 1-3 may be implemented by hardware, software, firmware and/or any combination of hardware, software and/or firmware. Thus, for example, any of the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330, the example lawful intercept auditor 335 and/or, more generally, the example communication network 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication network 100, the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330 and/or the example lawful intercept auditor 335 is/are hereby expressly defined to include a tangible computer readable storage device or storage disk such as a memory, a digital versatile disk (DVD), a compact disk (CD), a Blu-ray disk, etc. storing the software and/or firmware. Further still, the example label stack identifier 105 and/or, more generally, the example communication network 100 may include one or more elements, processes and/or devices in addition to, or instead of, those illustrated in FIGS. 1-3, and/or may include more than one of any or all of the illustrated elements, processes and devices.

Flowcharts representative of example machine readable instructions for implementing the example communication network 100, the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330 and/or the example lawful intercept auditor 335 are shown in FIGS. 4-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Also, one or more of the machine readable instructions represented by the flowcharts of FIGS. 4-7 may be implemented manually. Further, although the example program(s) is(are) described with reference to the flowcharts illustrated in FIGS. 4-7, many other methods of implementing the example communication network 100, the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330 and/or the example lawful intercept auditor 335 may alternatively be used. For example, with reference to the flowcharts illustrated in FIGS. 4-7, the order of execution of the blocks may be changed, and/or some of the blocks described may be changed, eliminated, combined and/or subdivided into multiple blocks.

As mentioned above, the example processes of FIGS. 4-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

Figure 4:
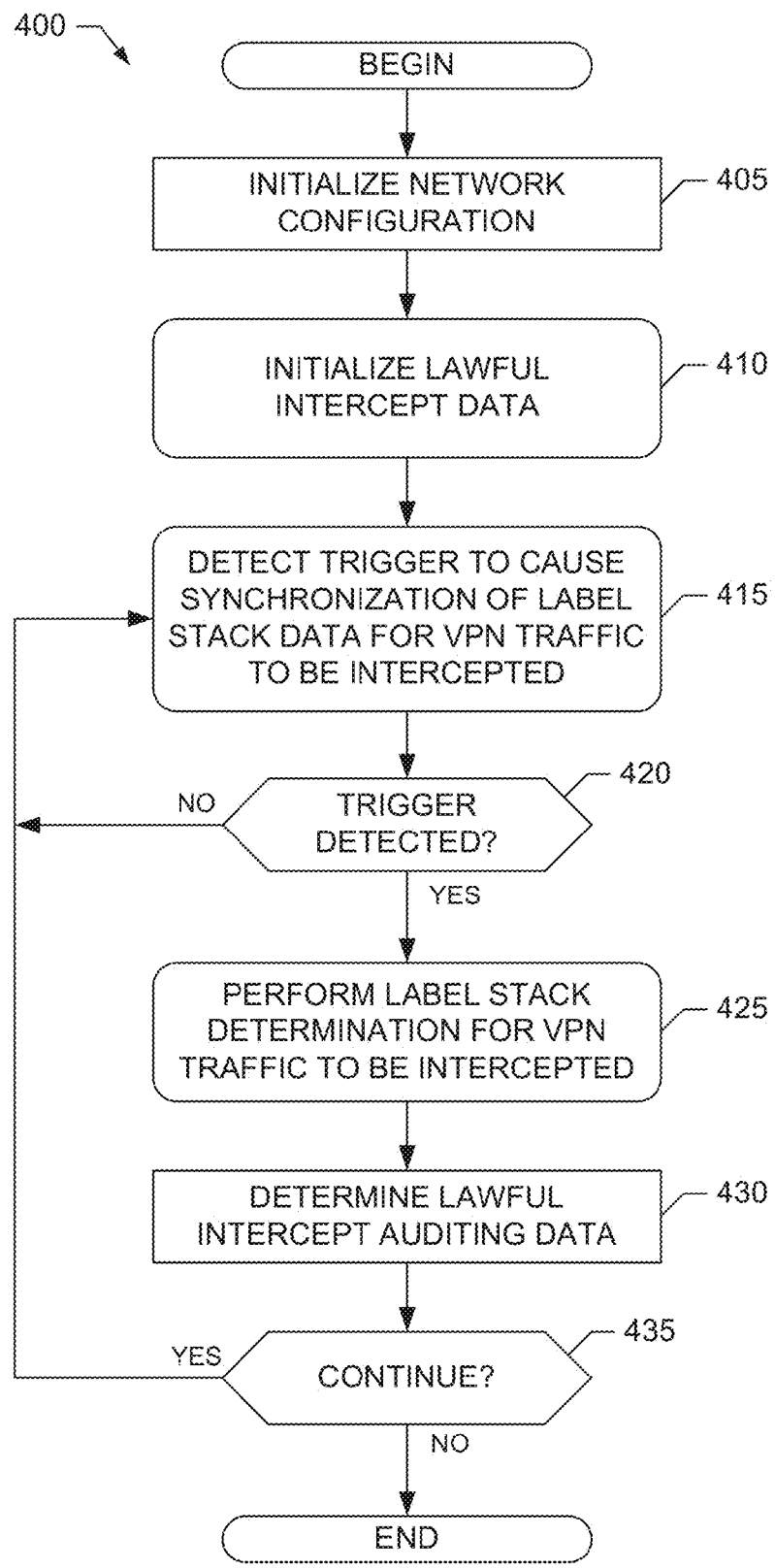
FIG. 4 is a flowchart representative of example machine readable instructions that may be executed to implement the example label stack identifier of FIG. 1.

An example program 400 including machine readable instructions that may be executed to implement the example label stack identifier 105 of FIGS. 1-3 is represented by the flowchart shown in FIG. 4. For convenience and without loss of generality, execution of the program 400 is described from the perspective of the example label stack identifier 105 of FIG. 3 operating in the example communication network 100 of FIG. 1. With reference to the preceding figures and associated written descriptions, the example program 400 of FIG. 4 begins execution at block 405 at which the lawful intercept initializer 310 of the label stack identifier 105 obtains configuration data for the network (e.g., the network 100) in which VPN traffic is to be intercepted. For example, at block 405 the lawful intercept initializer 310 can obtain, as described above, P router initialization information, PE router initialization information, network tap initialization information, etc., for the network elements in the network in which VPN traffic is to be intercepted.

Figure 5:
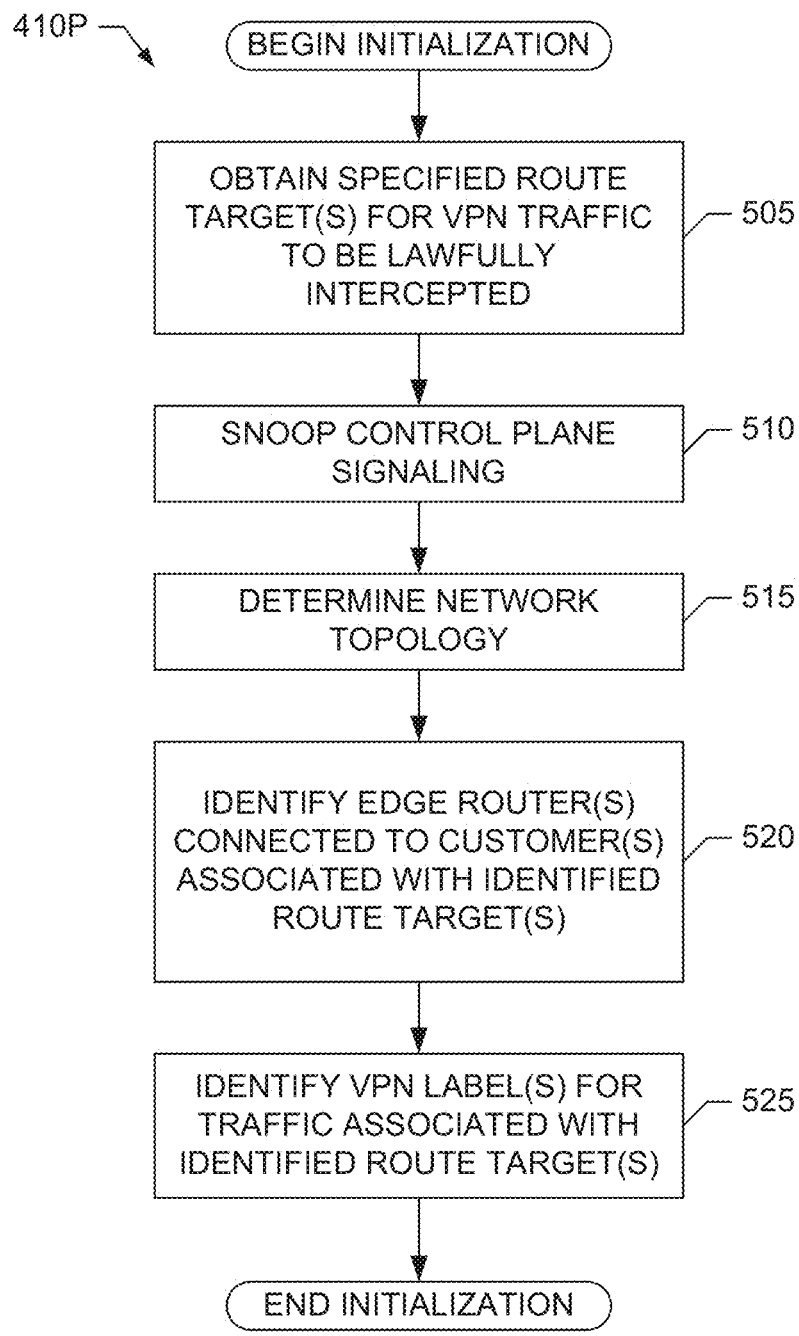
FIG. 5 is a flowchart representative of example machine readable instructions that may be executed to implement an example initialization procedure for the example label stack identifier of FIG. 1.

At block 410, the lawful intercept initializer 310 obtains initialization data specific to the VPN traffic to be intercepted. For example, at block 410, the lawful intercept initializer 310 obtains the route target(s), identifies the PE routers, identifies the VPN label(s), etc., associated with the VPN traffic to be intercepted, as described above. Example machine readable instructions that may be used to implement the processing at block 410 are illustrated in FIG. 5, which is described in greater detail below.

Figure 6:
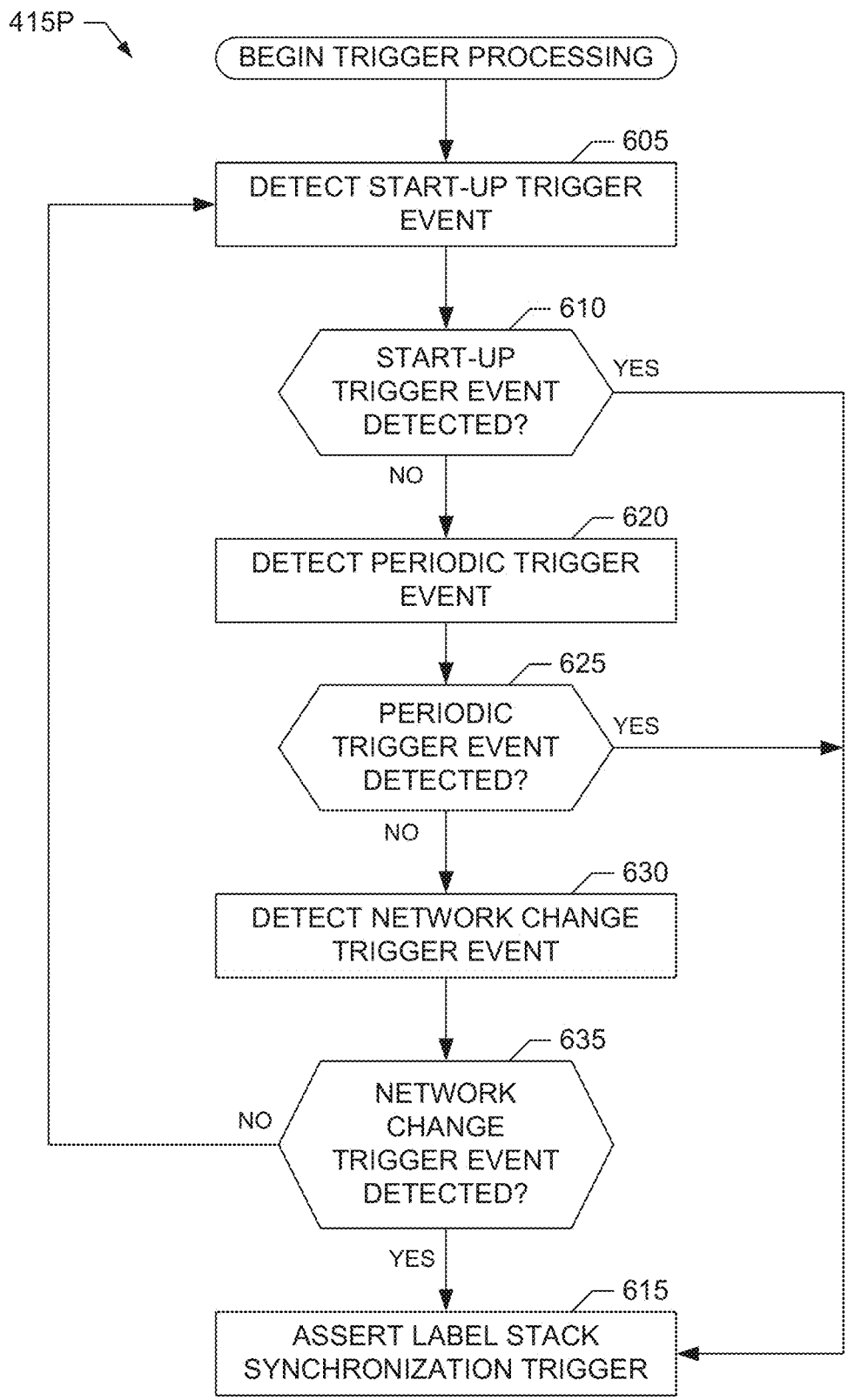
FIG. 6 is a flowchart representative of example machine readable instructions that may be executed to implement an example trigger processing procedure for the example label stack identifier of FIG. 1.

At block 415, the label stack synchronization trigger 330 of the label stack identifier 105 detects one or more triggers that are to cause the label stack identifier 105 to synchronize the label stack for the VPN traffic to be intercepted. For example, the label stack synchronization trigger 330 can detect one or more of (1) a start-up trigger, (2) a periodic timer trigger and/or (3) one or more event triggers, as described above. Example machine readable instructions that may be used to implement the processing at block 415 are illustrated in FIG. 6, which is described in greater detail below.

Figure 7:
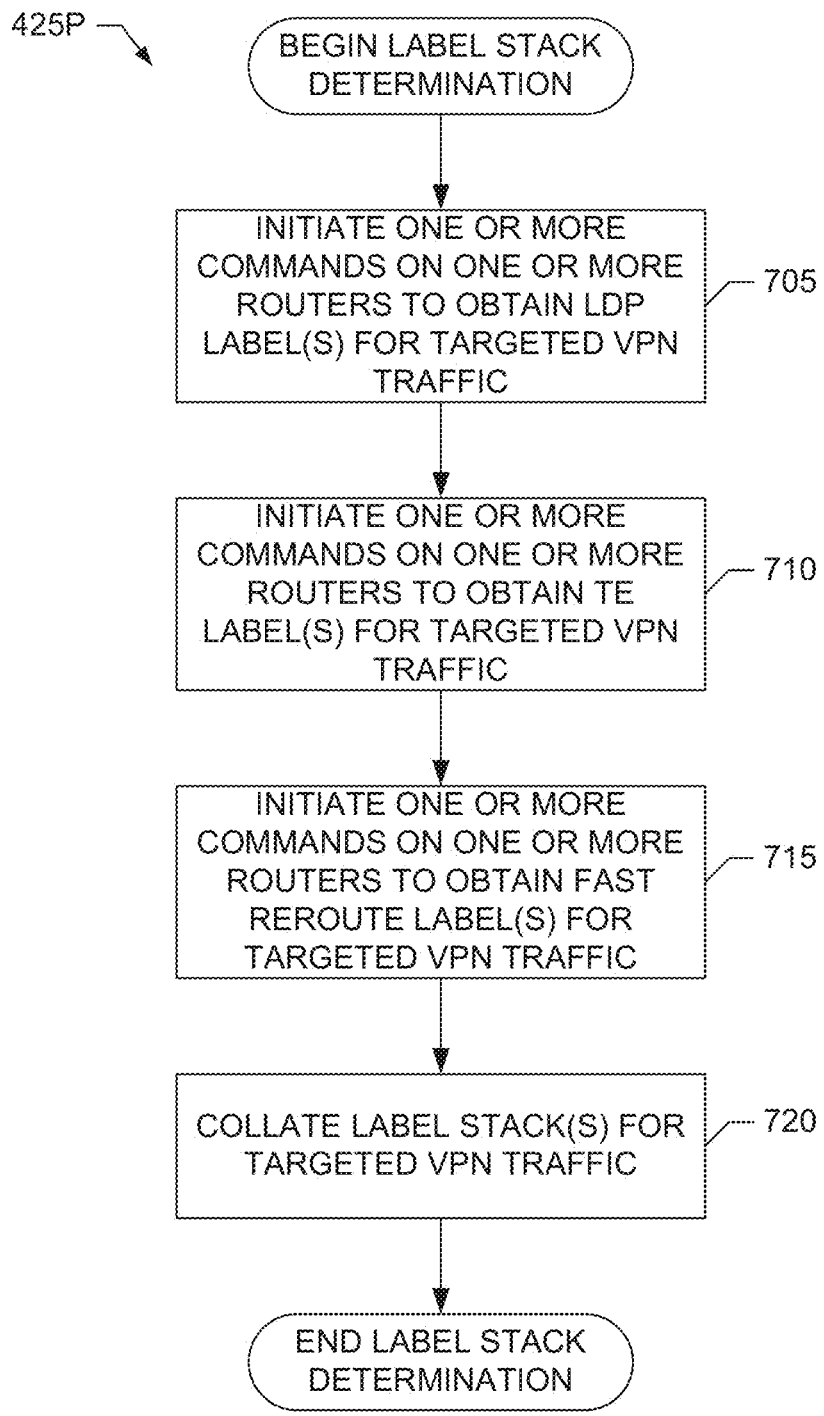
FIG. 7 is a flowchart representative of example machine readable instructions that may be executed to implement an example label stack determination procedure for the example label stack identifier of FIG. 1.

If a trigger is detected (block 420), processing proceeds to block 425. At block 425, the label stack identifier 105 performs label stack identification for the VPN traffic to be intercepted. For example, the label stack identifier 105 can identify the LDP, TE and/or FRR labels used to route the VPN traffic in the network, and can include those labels in the current label stack for the VPN traffic to be intercepted, as described above. Example machine readable instructions that may be used to implement the processing at block 425 are illustrated in FIG. 7, which is described in greater detail below.

At block 430, the lawful intercept auditor 335 of the label stack identifier 105 determines auditing data associated with the VPN traffic being intercepted, as described above. For example, at block 430 the lawful intercept auditor 335 can compare current label stack(s) determined for VPN traffic being intercepted with prior label stack(s) determined for the VPN traffic to assess whether the label stack(s) for the VPN traffic changed during a time interval while the traffic was being intercepted. In some examples, the auditing data determined by the lawful intercept auditor 335 for intercepted VPN traffic associated with a specified route target may indicate that the intercepted VPN traffic is reliable if the traffic's identified label stack did not change during the interval, whereas the auditing data determined by the lawful intercept auditor 335 may indicate that the intercepted VPN traffic may be unreliable if the traffic's identified label stack did change during the interval.

At block 435, the label stack identifier 105 determines whether lawful interception of VPN traffic is to continue. If lawful interception of VPN traffic is to continue (block 435), processing returns to block 415 and blocks subsequent thereto at which the label stack identifier 105 continues to perform label stack identification for the VPN traffic targeted for interception. Otherwise, execution of the example program 400 ends.

An example program 410P including machine readable instructions that may be used to implement processing at block 410 of FIG. 4 and/or that may be executed to implement the example the lawful intercept initializer 310 and/or the example control plane snooper 315 of the label stack identifier 105 of FIG. 3 is represented by the flowchart shown in FIG. 5. For convenience and without loss of generality, execution of the program 410P is described from the perspective of the example label stack identifier 105 of FIG. 3 operating in the example communication network 100 of FIG. 1. With reference to the preceding figures and associated written descriptions, the example program 410P of FIG. 5 begins execution at block 505 at which the lawful intercept initializer 310 obtains the route target(s) specified for the VPN traffic to be intercepted, as described above. At block 510, the control plane snooper 315 snoops the control plane signaling (e.g., such as the BGP routing update message) exchanged between the network elements in the network in which the VPN traffic is to be intercepted, as described above.

At block 515, the control plane snooper 315 determines the network topology for the network in which the VPN traffic is to be intercepted. For example, and as described above, the control plane snooper 315 can process the information obtained from snooping the control plane information and any other initialization information (e.g., such as that obtained at block 405 of FIG. 4) to determine which P routers are directly connected to which PE routers in the network, the location (e.g., in-country or out-of-country) of the routers in the network, the association(s) between network taps and network routers, etc. At block 520, the control plane snooper 315 process the information obtained from snooping the control plane information (e.g., from the snooped BGP update messages) to determine the edge routers (e.g., such as the in-country and out-of-country PE routers) carrying the VPN traffic associated with the specified route target(s), as described above. At block 520, the control plane snooper 315 process the information obtained from snooping the control plane information (e.g., from the snooped BGP update messages) to identify the VPN label(s) associated with the VPN traffic to be intercepted, as described above.

An example program 415P including machine readable instructions that may be used to implement processing at block 415 of FIG. 4 and/or that may be executed to implement the example label stack synchronization trigger 330 of the label stack identifier 105 of FIG. 3 is represented by the flowchart shown in FIG. 6. For convenience and without loss of generality, execution of the program 415P is described from the perspective of the example label stack identifier 105 of FIG. 3 operating in the example communication network 100 of FIG. 1. With reference to the preceding figures and associated written descriptions, the example program 415P of FIG. 6 begins execution at block 605 at which the label stack synchronization trigger 330 detects whether a start-up trigger event has occurred, as described above. If a start-up trigger event is detected (block 610), then at block 615 the label stack synchronization trigger 330 asserts a labels stack synchronization trigger to cause synchronization of label stack data for VPN traffic being intercepted to occur, as described above. At block 620, the label stack synchronization trigger 330 detects whether a periodic trigger event has occurred, as described above. If a periodic trigger event is detected (block 625), then at block 615 the label stack synchronization trigger 330 asserts a labels stack synchronization trigger to cause synchronization of label stack data for VPN traffic being intercepted to occur, as described above. At block 630, the label stack synchronization trigger 330 detects whether a network change trigger event has occurred, as described above. If a network change trigger event is detected (block 635), then at block 615 the label stack synchronization trigger 330 asserts a labels stack synchronization trigger to cause synchronization of label stack data for VPN traffic being intercepted to occur, as described above.

An example program 425P including machine readable instructions that may be used to implement processing at block 425 of FIG. 4 and/or that may be executed to implement the example router command processor 320 and/or the example routing label retriever 325 of the label stack identifier 105 of FIG. 3 is represented by the flowchart shown in FIG. 7. For convenience and without loss of generality, execution of the program 425P is described from the perspective of the example label stack identifier 105 of FIG. 3 operating in the example communication network 100 of FIG. 1. With reference to the preceding figures and associated written descriptions, the example program 425P of FIG. 7 begins execution at block 705 at which, as described above, the router command processor 320 initiates execution of one or more API commands (e.g., such as one or more show mpls forwarding commands) on the network elements (e.g., such as P routers) to obtain LDP label(s) for the VPN traffic to be intercepted. At block 705, the routing label retriever 325 also processes the responses received for the API command(s) initiated by the router command processor 320 to identify the LDP label(s) for the VPN traffic to be intercepted, as also described above.

At block 710, the router command processor 320 initiates execution of one or more API commands (e.g., such as one or more show mpls traffic-eng tunnels commands, such as one or more show mpls traffic-eng tunnels role head detail, show mpls traffic-eng tunnels role middle detail and/or show mpls traffic-eng tunnels role tail detail commands) on the network elements (e.g., such as P routers) to obtain TE label(s) for the VPN traffic to be intercepted, as described above. At block 710, the routing label retriever 325 also processes the responses received for the API command(s) initiated by the router command processor 320 to identify the TE label(s) for the VPN traffic to be intercepted, as also described above.

At block 715, the router command processor 320 initiates execution of one or more API commands (e.g., such as one or more show mpls traffic-eng tunnels backup commands) on the network elements (e.g., such as P routers) to obtain FRR label(s) for the VPN traffic to be intercepted, as described above. At block 715, the routing label retriever 325 also processes the responses received for the API command(s) initiated by the router command processor 320 to identify the FRR label(s) for the VPN traffic to be intercepted, as also described above.

At block 720, the routing label retriever 325 collates the LDP, the TE and any FRR labels with the VPN label(s) identified for the VPN traffic targeted for interception to form a current label stack for the targeted VPN traffic, as described above.

Figure 8:
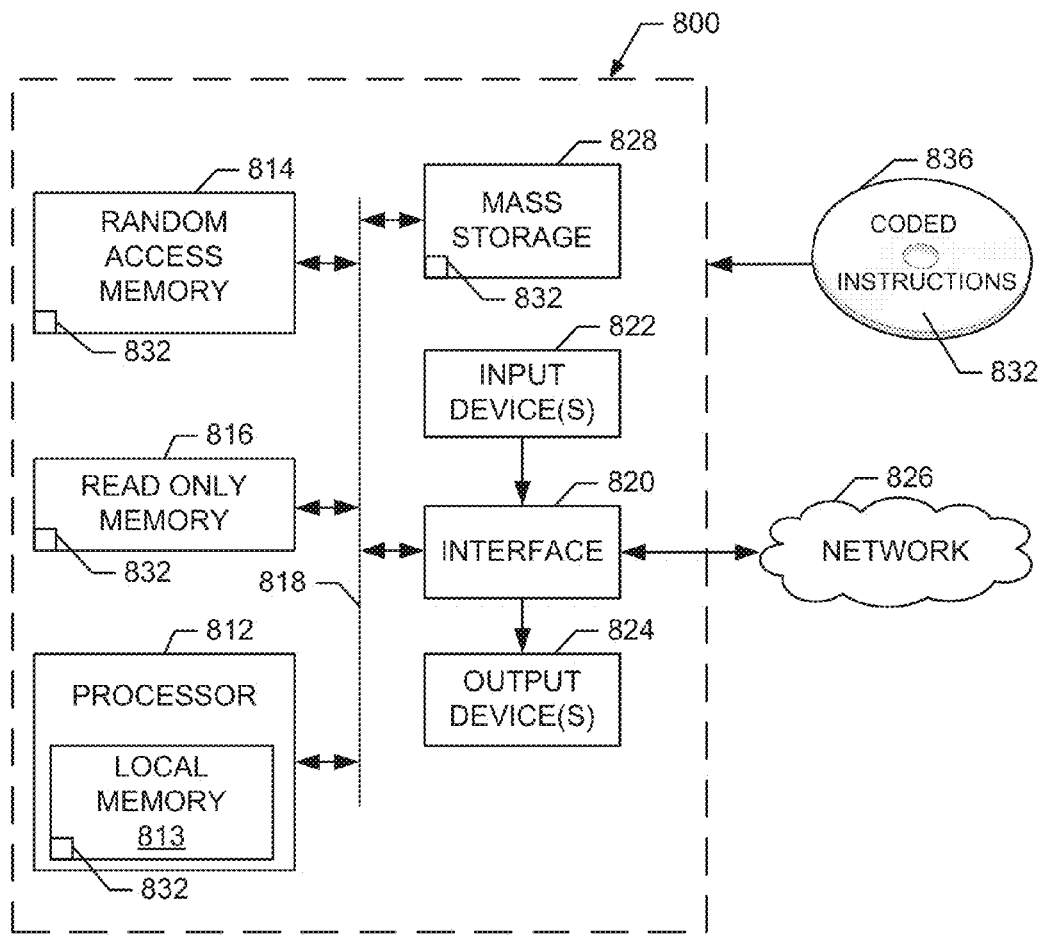
FIG. 8 is a block diagram of an example processor platform that may execute the example machine readable instructions of FIGS. 4-6 and/or 7 to implement the example label stack identifier of FIG. 1.

FIG. 8 is a block diagram of an example processor platform 800 capable of executing the instructions of FIGS. 4-7 to implement the example communication network 100, the example label stack identifier 105, the example in-country network 110, the example out-of-country network 115, the example PE routers 120 and/or 140, the example P routers 130, 135, 150, 155, 160 and/or 165, the example network taps 170 and/or 175, the example network interface 305, the example lawful intercept initializer 310, the example control plane snooper 315, the example router command processor 320, the example routing label retriever 325, the example label stack synchronization trigger 330 and/or the example lawful intercept auditor 335 of FIGS. 1-3. The processor platform 800 can be, for example, a server, a personal computer, a mobile device (e.g., a cell phone, a smart phone, a tablet such as an iPad), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache) (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826

(e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives.

Coded instructions 832 corresponding to the instructions of FIGS. 4-7 may be stored in the mass storage device 828, in the volatile memory 814, in the non-volatile memory 816, in the local memory 813 and/or on a removable tangible computer readable storage medium, such as a CD or DVD 836.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. A method to perform label stack identification for interception of virtual private network traffic, the method comprising:

detecting, with a processor, a trigger that is to cause synchronization of label stack data associated with first virtual private network traffic to be intercepted, the label stack data used to route the first virtual private network traffic in a network;

in response to detecting the trigger, initiating, with the processor, execution of a first command on a first router in the network to determine a first label used to route the first virtual private network traffic in the network;

in response to detecting the trigger, initiating execution of a second command on at least one of the first router and a second router in the network to determine a second label used to route the first virtual private network traffic in the network;

determining, with the processor, a current label stack for the first virtual private network traffic based on the first label and the second label; and providing the current label stack to a network tap that is to intercept the first virtual private network traffic.

2. The method of claim 1, further including:

snooping routing update messages exchanged between routers in the network to obtain a destination router of the first virtual private network traffic in the network;

selecting a result of executing the first command when next hop data included in the result of executing the first command includes the destination router;

reading the first label from the result of the first command;

selecting a result of executing the second command when a destination included in the result of executing the second command includes the destination router; and reading the second label from the result of the second command.

3. The method of claim 1, further including:

snooping routing update messages exchanged between routers in the network to obtain a destination router of the first virtual private network traffic in the network;

selecting a result of executing the first command when next hop data included in the result of executing the first command includes the destination router;

reading the first label from the result of the first command;

selecting a result of executing the second command when a destination included in the result of executing the second command includes the first router; and reading the second label from the result of the second command.

4. The method of claim 1, further including:

snooping update messages exchanged between routers in the network to obtain a third label used to route the first virtual private network traffic in the network; and determining the current label stack for the first virtual private network traffic based on the first label, the second label and the third label.

5. The method of claim 4, further including:

in response to detecting the trigger, initiating execution of a third command on a same target router on which the second command was executed;

when source and destination information included in a result of executing the third command includes the same target router and a router located opposite a tap via which the first virtual private network traffic is to be intercepted, reading a fourth label from the result of executing the third command; and determining the current label stack for the first virtual private network traffic based on the first label, the second label, the third label and the fourth label.

6. The method of claim 5, wherein the first label is a label distribution protocol label, the second label is a traffic engineering label, the third label is a virtual private network label and the fourth label is a fast reroute label.

7. The method of claim 1, further including comparing prior label stack data associated with the first virtual private network traffic with the current label stack determined for the first virtual private network traffic to determine auditing data associated with interception of the first virtual private network traffic.

8. The method of claim 1, wherein the trigger includes a change event occurring in the network, and the detecting of the trigger includes detecting occurrence of the change event.

9. The method of claim 8, wherein the detecting of the occurrence of the change event includes:
  receiving a trap corresponding to a tunnel associated with the change event; and
  determining whether the tunnel corresponding to the trap is also a tunnel carrying the first virtual private network traffic.

10. A tangible machine readable storage medium including machine readable instructions which, when executed, cause a machine to perform operations comprising:
  detecting a trigger that is to cause synchronization of label stack data associated with first virtual private network traffic to be intercepted, the label stack data used to route the first virtual private network traffic in a network;
  in response to detecting the trigger, initiating execution of a first command on a first router in the network to determine a first label used to route the first virtual private network traffic in the network;
  in response to detecting the trigger, initiating execution of a second command on at least one of the first router and a second router in the network to determine a second label used to route the first virtual private network traffic in the network;
  determining a current label stack for the first virtual private network traffic based on the first label and the second label; and
  providing the current label stack to a network tap that is to intercept the first virtual private network traffic.

11. The tangible machine readable storage medium of claim 10, wherein the operations further include:
  snooping update messages exchanged between routers in the network to obtain a third label used to route the first virtual private network traffic in the network; and
  determining the current label stack for the first virtual private network traffic based on the first label, the second label and the third label.

12. The tangible machine readable storage medium of claim 11, wherein the operations further include:
  in response to detecting the trigger, initiating execution of a third command on a same target router on which the second command was executed;
  when source and destination information included in a result of executing the third command includes the same target router and a router located opposite a tap via which the first virtual private network traffic is to be intercepted, reading a fourth label from the result of executing the third command; and
  determining the current label stack for the first virtual private network traffic based on the first label, the second label, the third label and the fourth label.

13. The tangible machine readable storage medium of claim 12, wherein the first label is a label distribution protocol label, the second label is a traffic engineering label, the third label is a virtual private network label and the fourth label is a fast reroute label.

14. An apparatus to perform label stack identification for interception of virtual private network traffic, the apparatus comprising:
  memory including machine readable instructions; and
  a processor to execute the machine readable instructions to perform operations including:
    detecting a trigger that is to cause synchronization of label stack data associated with first virtual private network traffic to be intercepted, the label stack data used to route the first virtual private network traffic in a network;
    in response to detecting the trigger, initiating execution of a first command on a first router in the network to determine a first label used to route the first virtual private network traffic in the network;
    in response to detecting the trigger, initiating execution of a second command on at least one of the first router and a second router in the network to determine a second label used to route the first virtual private network traffic in the network;
    determining a current label stack for the first virtual private network traffic based on the first label and the second label; and
    providing the current label stack to a network tap that is to intercept the first virtual private network traffic.

15. The apparatus of claim 14, wherein the operations further include:
  snooping update messages exchanged between routers in the network to obtain a third label used to route the first virtual private network traffic in the network; and
  determining the current label stack for the first virtual private network traffic based on the first label, the second label and the third label.

16. The apparatus of claim 15, wherein the operations further include:
  in response to detecting the trigger, initiating execution of a third command on a same target router on which the second command was executed;
  when source and destination information included in a result of executing the third command includes the same target router and a router located opposite a tap via which the first virtual private network traffic is to be intercepted, reading a fourth label from the result of executing the third command; and
  determining the current label stack for the first virtual private network traffic based on the first label, the second label, the third label and the fourth label.

17. The apparatus of claim 16, wherein the first label is a label distribution protocol label, the second label is a traffic engineering label, the third label is a virtual private network label and the fourth label is a fast reroute label.

* * * * *